(12) United States Patent
Sivertsen

(10) Patent No.: US 6,894,906 B2
(45) Date of Patent: May 17, 2005

(54) HOUSING FOR IN-LINE VIDEO, KEYBOARD AND MOUSE REMOTE MANAGEMENT UNIT

(75) Inventor: Clas G. Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 10/867,348

(22) Filed: Jun. 14, 2004

(65) Prior Publication Data

US 2004/0236833 A1 Nov. 25, 2004

Related U.S. Application Data

(63) Continuation-in-part of application No. 10/247,876, filed on Sep. 20, 2002.

(51) Int. Cl.[7] .............................. H05K 7/02; H05K 7/20
(52) U.S. Cl. ....................... 361/796; 361/752; 361/730; 361/728; 361/704; 361/707; 361/720; 361/715
(58) Field of Search ................................ 361/704, 707, 361/709, 728, 711–715, 729, 718–720, 730, 731, 735, 736, 788, 796, 797, 799, 800; 174/52.1

(56) References Cited

U.S. PATENT DOCUMENTS

| | | | | |
|---|---|---|---|---|
| 4,979,074 A | * | 12/1990 | Morley et al. ............... | 361/720 |
| 5,732,212 A | | 3/1998 | Perholtz et al. ............. | 709/224 |
| 5,777,874 A | | 7/1998 | Flood et al. .................... | 70/82 |
| 5,990,852 A | | 11/1999 | Szamrej ....................... | 345/2.1 |
| 6,054,676 A | * | 4/2000 | Wall et al. ................... | 219/209 |
| 6,065,072 A | | 5/2000 | Flath ............................ | 710/29 |
| 6,219,695 B1 | | 4/2001 | Guttag et al. ............... | 709/217 |
| 6,272,562 B1 | | 8/2001 | Scott et al. .................... | 710/16 |
| 6,304,895 B1 | | 10/2001 | Schneider et al. .......... | 709/203 |
| 6,330,167 B1 | * | 12/2001 | Kobayashi ................... | 361/818 |
| 6,377,461 B1 | * | 4/2002 | Ozmat et al. ................ | 361/704 |
| 6,378,014 B1 | | 4/2002 | Shirley ........................ | 710/100 |
| 6,434,003 B1 | * | 8/2002 | Roy et al. .................... | 361/699 |
| 6,476,854 B1 | | 11/2002 | Emerson et al. ............ | 348/143 |
| 6,560,641 B1 | | 5/2003 | Powderly et al. ........... | 709/219 |
| 6,603,665 B1 | * | 8/2003 | Truong et al. ............... | 361/752 |
| 6,609,034 B1 | | 8/2003 | Behrens et al. ............... | 700/19 |
| 6,636,929 B1 | | 10/2003 | Frantz et al. ................ | 710/313 |
| 6,651,190 B1 | | 11/2003 | Worley et al. ................. | 714/43 |
| 6,664,969 B1 | | 12/2003 | Emerson et al. ............ | 345/544 |
| 6,681,250 B1 | | 1/2004 | Thomas et al. ............. | 709/226 |
| 2002/0040418 A1 | | 4/2002 | Bress et al. .................. | 711/112 |
| 2002/0097234 A1 | | 7/2002 | Sauber ........................ | 345/204 |
| 2002/0194403 A1 | | 12/2002 | Pus et al. ...................... | 710/62 |

OTHER PUBLICATIONS

U.S. Appl. No. 10/016,484, filed Dec. 10, 2001, entitled "Systems and Methods for Capturing Screen Displays from a Host Computing System for Display at a Remote Terminal." Inventor: Umasankar Mondal.

U.S. Appl. No. 10/247,876, filed Sep. 20, 2002, entitled "Systems and Methods for Establishing Interaction Between a Local Computer and a Remote Computer." Inventor: Clas Gerhard Sivertsen.

(Continued)

Primary Examiner—Kamand Cuneo
Assistant Examiner—Dameon E. Levi
(74) Attorney, Agent, or Firm—Merchant & Gould

(57) ABSTRACT

Methods and devices provide for remote management of a local computer utilizing a compact, portable interaction device for external connection to a local computer and a network. The interaction device includes a thermally conductive housing with circuit boards disposed within. At least one heat-generating component is disposed on an outer surface of each circuit board with at least one thermally conductive pad for each circuit boards abutting the at least one heat generating component and the inner surface of the housing. The device also includes ventilation means for allowing ambient air to flow through the interior of the housing.

18 Claims, 17 Drawing Sheets

OTHER PUBLICATIONS

U.S. Appl. No. 10/790,160, filed Mar. 1, 2004, entitled "Method, System, and Apparatus for Communicating with a Computer Management Device." Inventor: Subash Kalbarga.

U.S. Appl. No. 10/867,406, filed Jun. 14, 2004, entitled "In–Line Video, Keyboard and Mouse Remote Management Unit." Inventor: Clas Gerhard Sivertsen.

U.S. Official Action dated Aug. 13, 2003 in U.S. Appl. No. 10/016,484.

U.S. Official Action dated Mar. 8, 2004 in U.S. Appl. No. 10/016,484.

U.S. Official Action dated Jun. 22, 2004 in U.S. Appl. No. 10/016,484.

U.S. Official Action dated Feb. 23, 2004 in U.S. Appl. No. 10/247,876.

U.S. Official Action dated Aug. 3, 2004 in U.S. Appl. No. 10/247,876.

* cited by examiner

HOUSING FOR IN-LINE VIDEO, KEYBOARD AND MOUSE REMOTE MANAGEMENT UNIT

CROSS-REFERENCE TO RELATED APPLICATIONS

This is a continuation-in-part of U.S. application Ser. No. 10/247,876, entitled "Systems and Methods for Establishing Interaction Between a Local Computer and a Remote Computer", filed Sep. 20, 2002, which is incorporated by reference herein.

TECHNICAL FIELD

The present invention relates to remote computer management devices. More particularly, the present invention relates to a housing for containing components of a keyboard, video, and mouse unit for remotely managing a local computer from another remotely located computer.

BACKGROUND OF THE INVENTION

Computers are often linked together through networks to allow the resources of a computer at one location to be used by a computer and end user at another location. In a distributed environment, computers known as servers perform various tasks for client computers that communicate with the server over a network. The server enables sharing of files and other resources between client computers and the server, such as electronic mail. As an example, a world wide web ("web") server may provide resources to client computers over the Internet.

It is often necessary to manage activities of a computer or determine the relative health of a computer system by viewing screen display information and/or interacting with the computer through user input devices. This is especially true for servers whose resources are utilized by many individual client computers, such as within a corporate network or the Internet. For many conventional systems, the technician or other user who needs to view the screen displays and interact with the computer being managed is required to be physically located at the site of the computer. However, it is not always feasible for a technician or other user to be physically present.

Present solutions to providing remote management are a service under the operating system or a software application such as PC ANYWHERE from SYMANTEC CORPORATION. However, because these present solutions are software based, the operating system must be operational with all services loaded to allow the remote monitoring to occur. Therefore, configuration and boot-up screens such as those provided by a BIOS are not made available to the remote location. For this reason, utilization of a hardware-based device is desirable. Because applications of a hardware-based remote management device may require frequent transport by a technician who will install the device for troubleshooting purposes or shipment of the device to a location for connection to a local computer, it is also desirable to minimize the device footprint to provide a device that is portable and unobtrusive.

A problem with minimizing the footprint of a device containing electrical components involves the issue of heat dissipation. Electrical components generate heat. When heat-generating components are mounted closely together on a circuit board or a plurality of circuit boards, and then encased by a housing, a risk of operational failure due to excessive heat generation is created. It is with respect to these considerations and others that the present invention has been made.

SUMMARY OF THE INVENTION

Aspects of the present invention address these problems and others by providing an interaction device for obtaining screen displays of a local computer and providing them to a remote computer over a network. The interaction device includes a thermally conductive housing with a plurality of circuit boards disposed within. First and second circuit boards have outer surfaces that face inner surfaces of the housing. The device further includes at least one heat-generating component disposed on the outer surface of each of the first and second circuit boards.

At least one thermally conductive pad for each of the first and second circuit boards is disposed intermediate the outer surfaces of the circuit boards and the inner surfaces of the housing such that one side of each pad abuts the inner surface of the housing and an opposing side of each pad abuts the heat-generating components disposed on the outer surface of the circuit board. The device also includes ventilation means for allowing ambient air to flow through the interior of the housing.

Another aspect of the invention is a method of assembling an interaction device for obtaining screen displays of a local computer and providing them to a remote computer over a network. A thermally conductive pad is positioned such that it contacts an outer surface of a first circuit board. The first circuit board and thermally conductive pad are secured inside a bottom housing cover such that the thermally conductive pad contacts an inner surface of the bottom housing cover. A second thermally conductive pad is positioned such that it contacts an outer surface of a second circuit board. The second circuit board is electrically coupled to the first circuit board and secured inside the bottom housing cover. A top housing cover is placed over the second circuit board such that an inner surface of the top cover contacts the thermally conductive pad. The top housing cover is then secured to the bottom housing cover.

Yet another aspect is an interaction device for obtaining screen displays of a local computer and providing them to a remote computer over a network. The interaction device includes a network connection and a video input connection. The interaction device further includes a metal housing having a first substantially planar surface and a parallel second substantially planar surface. A first circuit board is disposed within the housing and contains a frame grabber circuit for capturing screen frame data from the local computer. The first circuit board is positioned within the housing in a plane substantially parallel to the plane of the first substantially planar surface, and the frame grabber circuit is disposed on a side of the first circuit board facing the first substantially planar surface.

A second circuit board is disposed within the housing and contains a network interface linked to the network connection and a processing device for directing the screen frame data captured by the frame grabber circuit of the first circuit board through the network interface. The second circuit board is positioned within the housing in a plane parallel to the first circuit board. The processing device and network interface are disposed on a side of the second circuit board facing the second substantially planar surface.

A thermally conductive pad is disposed between the first circuit board and the first substantially planar surface and is in contact with the frame grabber circuit of the first circuit board and the first substantially planar surface. Another thermally conductive pad is disposed in the gap between the second circuit board and the second substantially planar surface and is in contact with the network interface and processing device of the second circuit board and the second substantially planar surface.

These and various other features as well as advantages, which characterize the present invention, will be apparent from a reading of the following detailed description and a review of the associated drawings.

DETAILED DESCRIPTION

Local computers may be managed remotely through embodiments of the present invention so that the system manager or other user need not be physically present with the local computer but instead views screen displays and interacts with the local computer through a remotely located computer. For example, the user can remotely view screen frames being produced by the local computer to determine whether the local computer has crashed or whether the local computer is executing a particular application. Additionally, the end user may operate a user input device of the remote computer such as a mouse or keyboard, and the user input is transferred to the local computer where it can be implemented.

Figure 1:
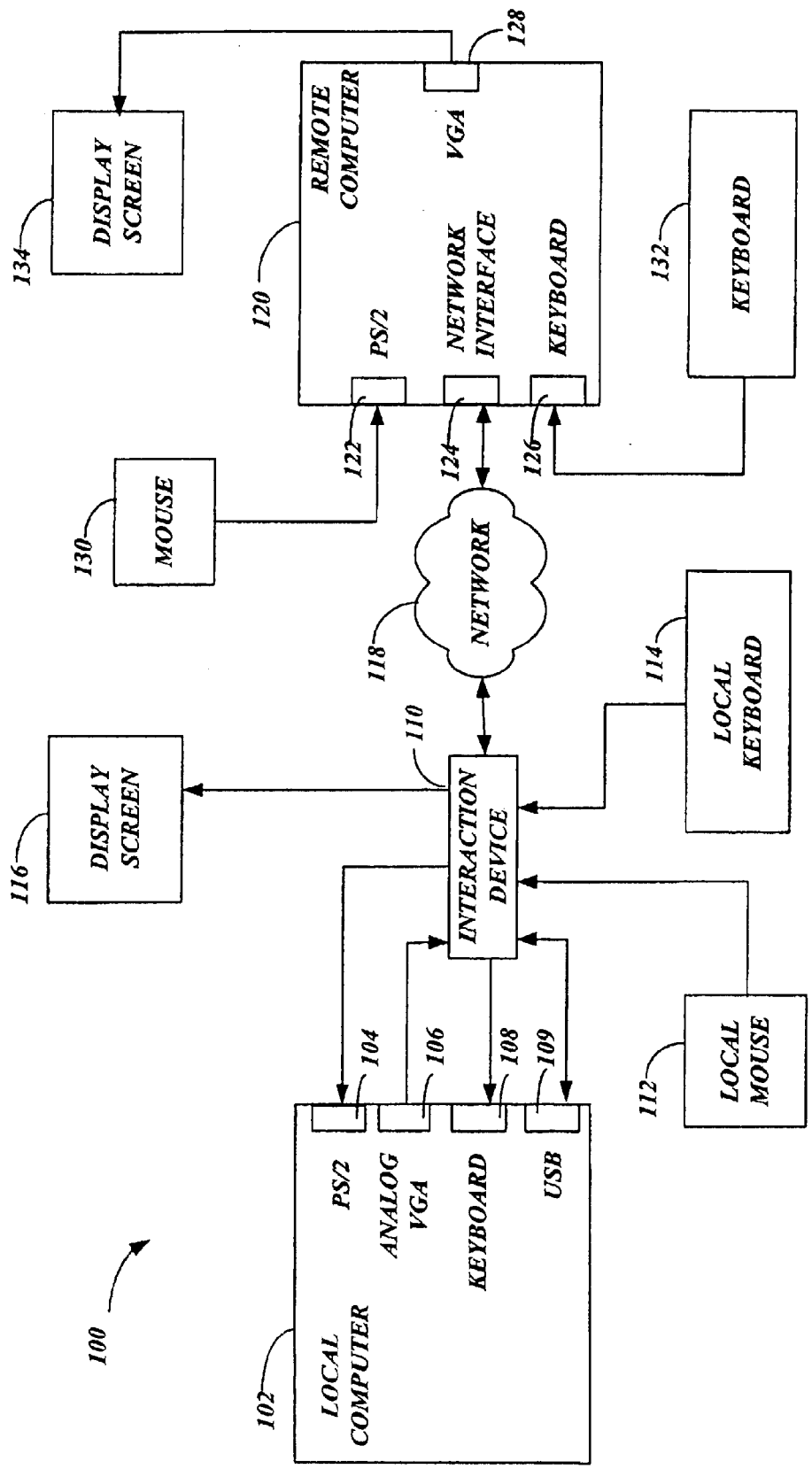
FIG. 1 illustrates a network operating environment for embodiments of the present invention that allow a remote computer to display screen frames of a local computer and provide user interaction with the screen frames.

An environment for application of embodiments of the present invention is shown in FIG. 1. The environment generally includes a local computer 102 that is to be remotely managed. An interaction device 110 is disposed between a network 118 and the local computer 102. A remote computer 120 is linked to the network 118, and the local computer 102 may or may not be linked to the same network 118 or another network not shown. The network 118 may be of various forms such as a local area network ("LAN") or wide area network ("WAN") including the Internet. A user is located at the remote computer 120 and remotely manages the local computer 102 via the network 118 and interaction device 110.

The interaction device 110 may be linked to the local computer 102 through several input/output ("I/O") connections of the local computer 102. Generally, a local computer 102 will have a video display output 106, such as an analog or digital VGA output. Also, the local computer 102 typically includes a PS/2 port or ordinary serial port configured as a mouse port 104, a keyboard port 108, and may also or alternatively include a universal serial bus ("USB") port 109.

The video display output 106 provides a signal that ordinarily is passed directly to a display screen or monitor 116 where screen frames are displayed for a user present at the local computer 102. However, in the embodiment shown, the video display output 106 provides a video signal to a video input of the interaction device 110. The interaction device 110 then passes the video signal through a video output to the display screen 116 where a normal video display of screen frames occurs. The details of the interaction device 110 and its operations upon the video signal are provided below with reference to FIGS. 2–4.

User input devices may also be provided for the local computer 102, including a local mouse 112 and local keyboard 114. Conventionally, the local mouse 112 and local keyboard 114 would be directly connected to the mouse port 104 and keyboard port 108 of the local computer 102. However, for the embodiment shown, the local mouse 112 and local keyboard 114 are connected to a mouse port and keyboard port, respectively, of the interaction device 110 and provide mouse and keyboard data to the interaction device 110 through these connections. The interaction device 110 then passes the mouse data and keyboard data to the respective ports of the local computer 102.

In addition to providing the pass-through of the video signal to the display screen 116, the interaction device 110 captures screen frame data from the video signal and transfers the screen frame data across the network 118 to the remote computer 120. The remote computer 120 has a network interface 124 linking the remote computer 120 to the network 118. The network interface 124 used by the remote computer 120 may be of various forms such as a dial-up modem or an Ethernet connection to a LAN. Various protocols of data transfer may be utilized between the interaction device 110 and the remote computer 120, such as the TCP/IP protocol ordinarily used via the Internet.

The remote computer 120 implements an application, such as a dedicated application or general purpose browser window such as a web browser, for receiving the screen frame data through the network interface 124 and providing a display on the display screen 134. The display includes the screen frame produced by the local computer 102 that corresponds to the screen frame data transferred by the interaction device 110. Typically, the remote computer 120 includes a video adapter that has a video output 128 connected to the display screen 134 to provide the video signals.

To allow the user of the remote computer 120 to fully interact with the local computer 102, user interface devices such as a mouse 130 and keyboard 132 are connected to a mouse port 122 and keyboard port 126, respectively, of the remote computer 120. The user manipulates the mouse 130 and keyboard 132 to interact with the screen frame shown on the display screen 134, which may be formed wholly or in part by the screen frame data received over the network 118. When the user activity at the remote computer 120 is entered with respect to the screen frame data received from the interaction device, then the processing device of the remote computer 120 transfers the user activity data over the network 118 to the interaction device 110 that passes it to the mouse port 104 and/or keyboard port 108.

Once the local computer 102 receives the user activity data through the mouse port 104 and/or keyboard port 108, the local computer 102 then implements the user activity as if it had occurred through the local mouse 112 or local keyboard 114. When implemented, the user activity alters the screen frame to be displayed. Therefore, the video signal output by the video connector 106 to the interaction device 110 provides the screen frames that show the change caused by the user activity at the remote computer 120, such as the mouse pointer moving or letters appearing in an electronic document.

The interaction device 110 transfers the screen frame data showing the user activity to the remote computer 120 where it is then provided to the display screen 134. Thus, the user activity initially performed at the remote computer 120 is represented on the display screen 134 immediately as it is being performed by the user and then once again after updating the video display of the local computer 102 and transferring the updated screen frame back to the remote computer 120.

As processing and propagation delays decrease within the environment 100, the initial and subsequent display of the same user activity (i.e., multiple cursors or mouse pointers) on the display screen 134 converge in time so that the user sees only one change. For example, moving a mouse pointer within the local computer screen frame shown on the display screen 134 may appear immediately as the user performs the activity and then later reappear such as a ghost movement once the screen frame update is received. However, as delays are reduced, for example by Giga-bit per second network transfer rates, the initial and subsequent mouse pointer movements converge to one movement as perceived by the user of the remote computer 120. Furthermore, as discussed below, the mouse over window option may be turned off for a browser window so that only a single mouse cursor is shown at all times, regardless of propagation delays.

In addition to receiving user input, the interaction device 110 may also provide for additional interaction with the remote computer 120 by providing a USB connection to a USB port 109 of the local computer 102. The USB connection allows the interaction device 110 to emulate USB devices for the local computer 102, such as additional storage devices including devices that the local computer 102 may use when booting-up. For example, the remote computer 120 may provide a floppy, CD-ROM, or hard disk drive that contains a boot-up sequence to be used by the local computer 102. Upon a connection being established over the network 118 between the interaction device 110 and remote computer 120, the local computer 102 may boot from a media source of the remote computer 120 with the boot-up sequence provided through the USB port 109.

The USB connection from the interaction device 110 may also allow a local keyboard and mouse and/or a keyboard and mouse of the remote computer to be emulated for the local computer 102. For example, the local computer 102 may have only USB ports instead of PS/2 ports and the interaction device 110 outputs mouse and keyboard signals to the local computer through the USB connection.

Figure 2A:
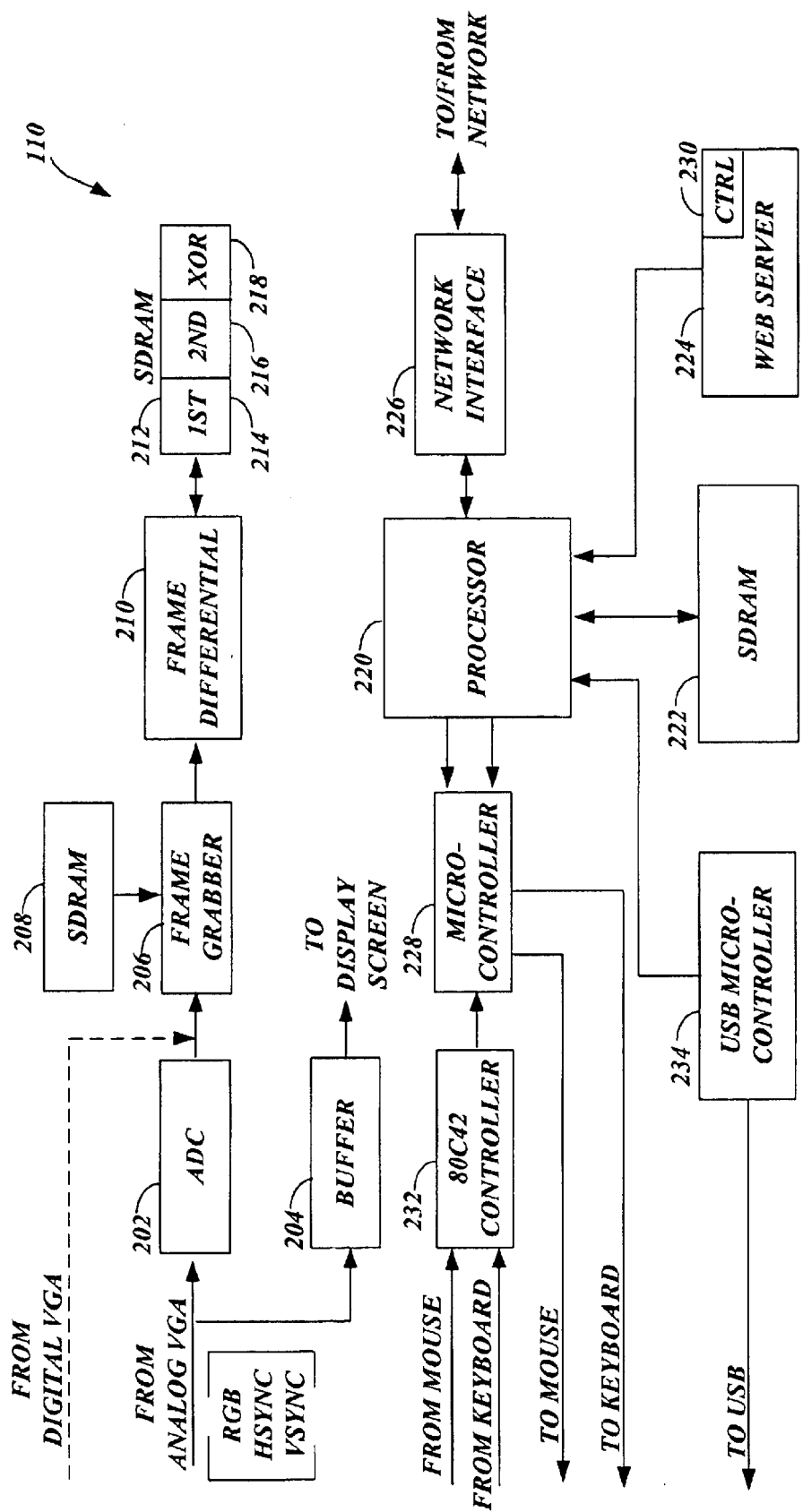
FIG. 2A shows the functional components of one embodiment of the present invention.

FIG. 2A shows the major components of one embodiment of the interaction device 110 of FIG. 1. This embodiment of the interaction device 110 includes an analog to digital converter 202 and a video buffer 204, and both of these receive the analog VGA video signal from the local computer 102. The analog VGA signal includes five distinct signals, including a red drive, a blue drive, a green drive, a horizontal synchronization pulse, and a vertical synchronization pulse. The video buffer 204 conditions the video signal through amplification and outputs it to the display screen 116 so that splitting the video signal between the converter 202 and the display screen 116 does not degrade the signal and the resulting display.

The converter 202 digitizes the video signal including the five distinct signals. The converter 202 then outputs the digitized video signal to a frame grabber 206. As one alternative, a digital video output of the local computer 102, if available, could be provided to the frame grabber 206 in place of the analog video signal that has been digitized as described above. As will be discussed in detail below with respect to FIG. 2B, this alternative requires a DVI receiver 236 and DVI transmitter 242, as well as an additional DVI transmitter 238 and a DVI receiver/scaler 240 if the signal is to be scaled prior to being transmitted to the frame grabber 206.

The frame grabber 206 takes the portion of the digitized video signal corresponding to one screen frame and outputs that portion of the digitized signal as discrete screen frame data. The converter 202 and frame grabber 206 may be separate components or may be incorporated as one component. For example, an LCD controller may be used as a frame grabber 206 to capture the screen frame data.

The screen frame data is utilized by a frame differential component 210 to compute a difference between screen frame data of a current screen and a screen frame data of an immediately preceding screen frame. The frame differential component 210 maintains a previous screen frame data in a first memory location 214 in SDRAM 212 and maintains the current screen frame data in a second memory location 216. The frame differential component 210 then executes an exclusive OR ("XOR") Boolean operation upon the two sets of screen frame data to indicate where the changes have occurred between the two. The result of the XOR operation is stored in a third memory location 218.

The frame differential component 210 provides the screen frame data to a processing device 220 so that it may be transmitted. The screen frame data 210 may be either the entire screen frame data of the most current screen frame grabbed from the digitized video signal, or may be the screen frame data making up the difference detected by the XOR operation described above. Providing only the screen frame data representing the difference between the current screen frame and the preceding screen frame results in less data being distributed over the network 118.

Additional filtering functionality of the frame differential component 210 that is applicable when the analog video is digitized to reduce the amount of unnecessary data transfer may also be included, such as applying threshold comparisons to the most current screen frame data to determine whether to send the results of the XOR operation or send no new screen frame data. The threshold of this filtering component may be set as desired. As an example, the filter may look apply a 7 bit per pixel threshold to determine whether the screen frame data has had a significant change worth transmitting or only contains sampling noise where an analog to digital converter is used. When changes in the current screen frame data are significant as determined by the threshold, then the result of the XOR may be transmitted. The frame differential component 210 may be implemented in various ways, including a programmable logic device such as an field programmable gate array or application specific integrated circuit that is configured to implement the XOR operations and provide the result to the processing device 220.

The processing device 220 interacts with the frame differential component 210 to access the screen frame data to be provided to a network interface device 226. The processing device 220 may be implemented in various ways discussed above, such as but not limited to the POWERPC 405GPr general purpose reduced instruction set processor manufactured by IBM CORPORATION. The processing device 220 employs logic to package the screen frame data for transfer by the network device 226 via a particular protocol, such as TCP/IP.

The screen frame data may be packaged for distribution by the processing device 220 from a network node established by the processing device 220 through the network interface 226. As one alternative, the processing device 220 in association with the network interface 226 may implement logic to behave as a web server 224 having a particular IP address for the network 118. The web server 224 provides the screen frame data as a resource that can be requested by a remote computer 120 through the network 118 by accessing the IP address of the web server 224 via a dedicated or generic browser window, such as a web browser like Internet Explorer by Microsoft®.

The screen frame data may be utilized by the browser window of the remote computer 120 in various ways. As an example, the browser window may be used to download the screen frame data in a continuous streaming manner and the screen frame data may be incorporated for display on the screen 134 by a dedicated application program of the remote computer 120. As another example, the browser window of the remote computer 120 may download the screen frame data in a continuous streaming manner for display of the screen frames on the screen 134 within the browser window itself such as where the browser window is a web browser. The browser window may implement browser commands of plug-in logic dedicated for a particular operating system platform such as an ACTIVE X control to display the screen frames, or alternatively may implement a virtual machine that runs system independent browser commands such as a JAVA applet.

The processing device 220 interacts with SDRAM 222 to perform the processing operations including receiving the screen frame data and packaging the data for transfer by the network interface 226. Generally, the processing device 220 or network interface includes a media access control ("MAC"). The MAC obtains carrier access within a network to transmit the packets of the screen frame data and/or browser commands for physical layer transfer by the network interface 226. The network interface 226 may be of various forms such as a dial-up, digital subscriber line, ISDN, or cable modem or an Ethernet transceiver directly linked to a data network. The data is transferred from the transceiver of the network interface 226 via the network 118 to the appropriate IP address of the network interface 124 of the remote computer 120.

In addition to transferring the screen data to the remote computer 120 via the network 118, the network interface 226 also receives data transferred from the remote computer 120 over the network 118. The network interface 226 receives the request for screen frame data that occurs once the remote computer's browser has been directed to the IP address of the web server 224 of the interaction device 110. An example of a network interface 226 is a "phy" such as model LXT972A manufactured by INTEL CORPORATION.

Additionally, the network interface 226 may receive data from the remote computer 120 that is indicative of the user activity occurring on the user interface devices of the remote computer 120. As discussed above, the end user may interact with the local computer screen frame being displayed on the screen 134 of the remote computer 120 by using the mouse and keyboard when the focus of the remote computer 120 is within the browser window display. The browser commands receive the user input of the user interface device and generate data corresponding to the user input relative to the local computer screen frame. The data is transmitted to the interaction device 110.

The interaction device 110 receives the data indicating the user activity through the network interface 226 where it is unpackaged from its transmitted state back to data that can be interpreted by the processing device 220. The processing device 220 receives the data describing the user activity that took place through the user interface devices of the remote computer 102. The processing device 220 then outputs a user interface command to a microcontroller 228 that arbitrates between the user input received over the network and the local user input received through a bus connection to an 80C42 compatible keyboard/mouse controller 232 that is coupled to the local mouse and keyboard. The microcontroller 228 may arbitrate by giving priority to one of the inputs where both the local and remote user input is received simultaneously to produce a clock and data output that is sent to the mouse or keyboard port of the local computer 102. In many instances, it may be appropriate to give the user input received over the network connection priority over local user inputs.

The local computer 102 implements the user activities transferred to the interaction device 110 over the network 118 as if they occurred through the user interface devices (i.e., mouse 112 and/or keyboard 114) directly coupled to the interface device 110. The user interface data provided as signals from the mouse or keyboard ports of the microcontroller 228 to the mouse port 104 or keyboard port 108 of the local computer 102 appear as ordinary mouse and keyboard data and clock signals.

To establish the USB connectivity discussed above between the interaction device 110 and the local computer 102, a USB microcontroller 234 may be included. The USB microcontroller 234 communicates with the processing device 220 to emulate a USB node for the local computer 102. Thus, a media source of the remote computer may be accessible by the local computer 102 by the USB microcontroller 234 emulating a USB media device for the local computer 102. Also, as discussed above, the USB microcontroller 234 may allow the emulation of a keyboard and mouse for the USB input of the local computer 102 to pass local and/or remote keyboard and mouse signals to the local computer 102.

Figure 2B:
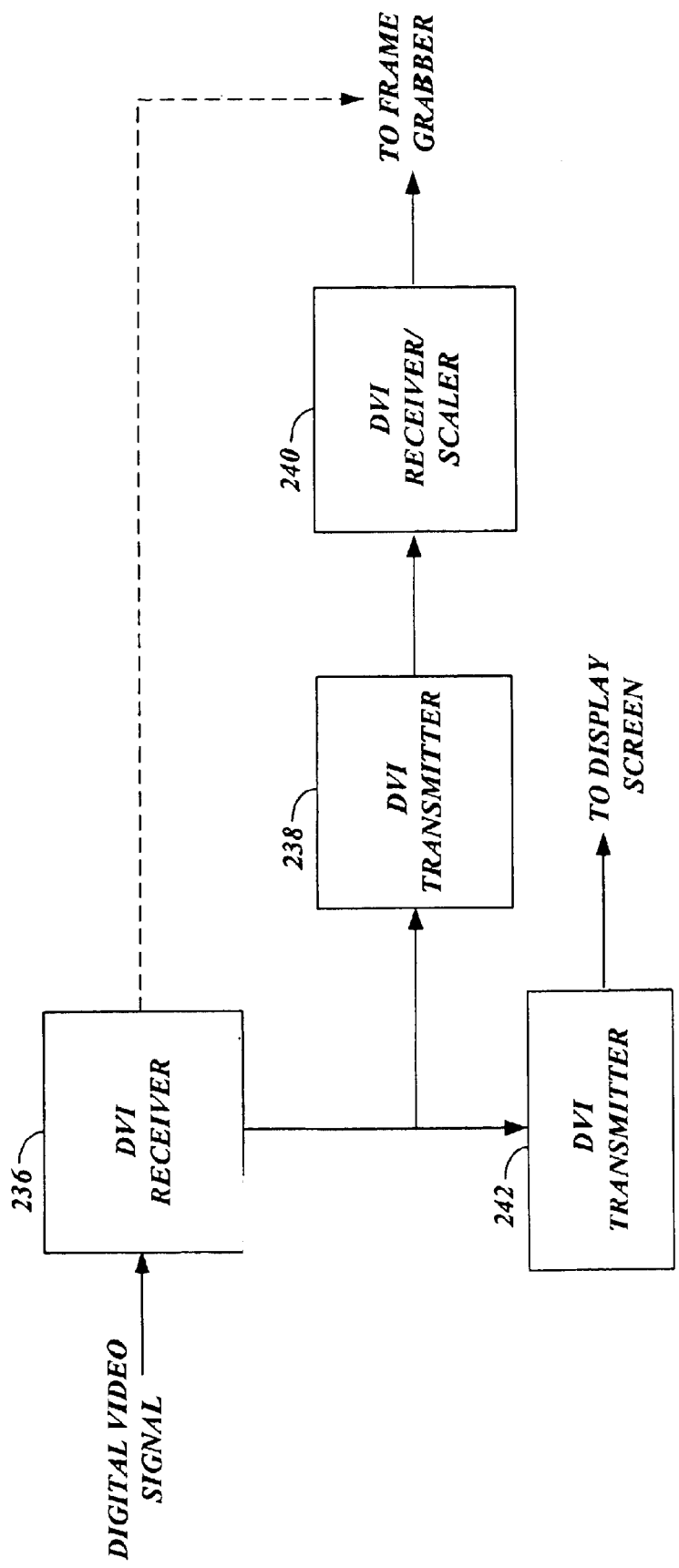
FIG. 2B shows the functional components for processing digital video signals within the embodiment of the present invention depicted in FIG. 2A.

As described briefly above, FIG. 2B depicts the interaction device components that replace the analog to digital converter 202 and the buffer 204 when a digital video signal is input to the interaction device 110 from local computer 102. First, the digital video signal is received at DVI receiver 236. The DVI receiver 236 creates and outputs a digital RGB signal from the digital video signal.

If it is desirable for the digital RGB signal to be scaled prior to capture and transmission through network 118 to remote computer 120, then DVI receiver 236 transmits the digital RGB signal to a DVI transmitter 238. The DVI transmitter 238 creates a duplication of the digital video signal from the digital RGB signal and transmits the duplication to DVI receiver/scaler 240. The DVI receiver/scaler 240 creates a scaled digital RGB signal from the duplication signal, which is sent to frame grabber 206, which stores screen frame data from the scaled digital RGB signal. If the digital RGB signal is not to be scaled prior to transmission through network 118 to remote computer 120, the digital RGB signal is transmitted to frame grabber 206.

The digital RGB signal created by DVI receiver 236 is also simultaneously transmitted to the DVI transmitter 242. The DVI transmitter 242 creates a second duplication of the digital video signal from the digital RGB signal and transmits the second duplication via video output port 800 (shown in FIG. 13A) to local display screen 116.

Figure 3A:
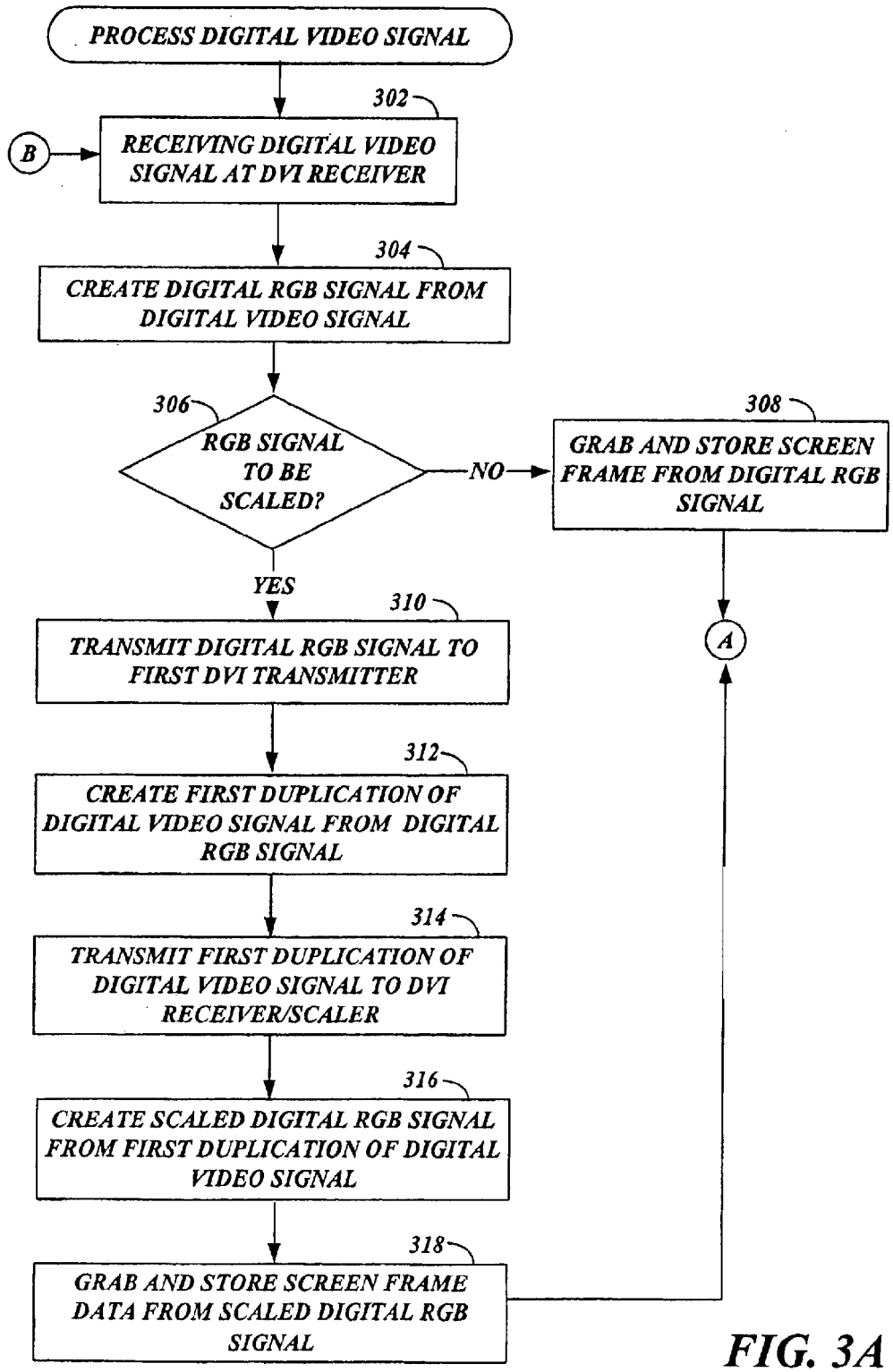
FIG. 3A depicts the logical operations for processing a digital video signal according to an embodiment of the present invention.

FIG. 3A depicts the logical operations 300 for processing a digital video signal through an interaction device 110 according to one embodiment of the present invention. First, a digital video signal is received at the DVI receiver 236 at receiving operation 302. A digital RGB signal is created from the digital video signal at signal creating operation 304. At decision operation 306, a determination is made as to whether the digital RGB signal is to be scaled prior to transmission through a network to the remote computer 120. If not, the process 300 proceeds to grab operation 308 where screen frame data from the digital RGB signal is grabbed and stored by the frame grabber 206 for use by the frame differential component 210. The process 300 then proceeds to step 332 of FIG. 3C as described below.

If, at decision operation 306, it is determined that the signal is to be scaled, the process 300 proceeds to transmit operation 310 where the digital RGB signal is transmitted to the DVI transmitter 238. The DVI transmitter 238 creates a first duplication of the digital video signal from the digital RGB signal at duplication operation 312. This first duplication signal is transmitted to the DVI receiver/scaler 240 at transmit operation 314. At scaling operation 316, the receiver/scaler 240 creates a scaled digital RGB signal from the first duplication signal. The process 300 then proceeds to frame operation 318 where screen frame data from the scaled digital RGB signal is grabbed and stored by the frame grabber 206 for use by the frame differential component 210. The process 300 then proceeds to step 332 of FIG. 3C as described below.

Figure 3B:
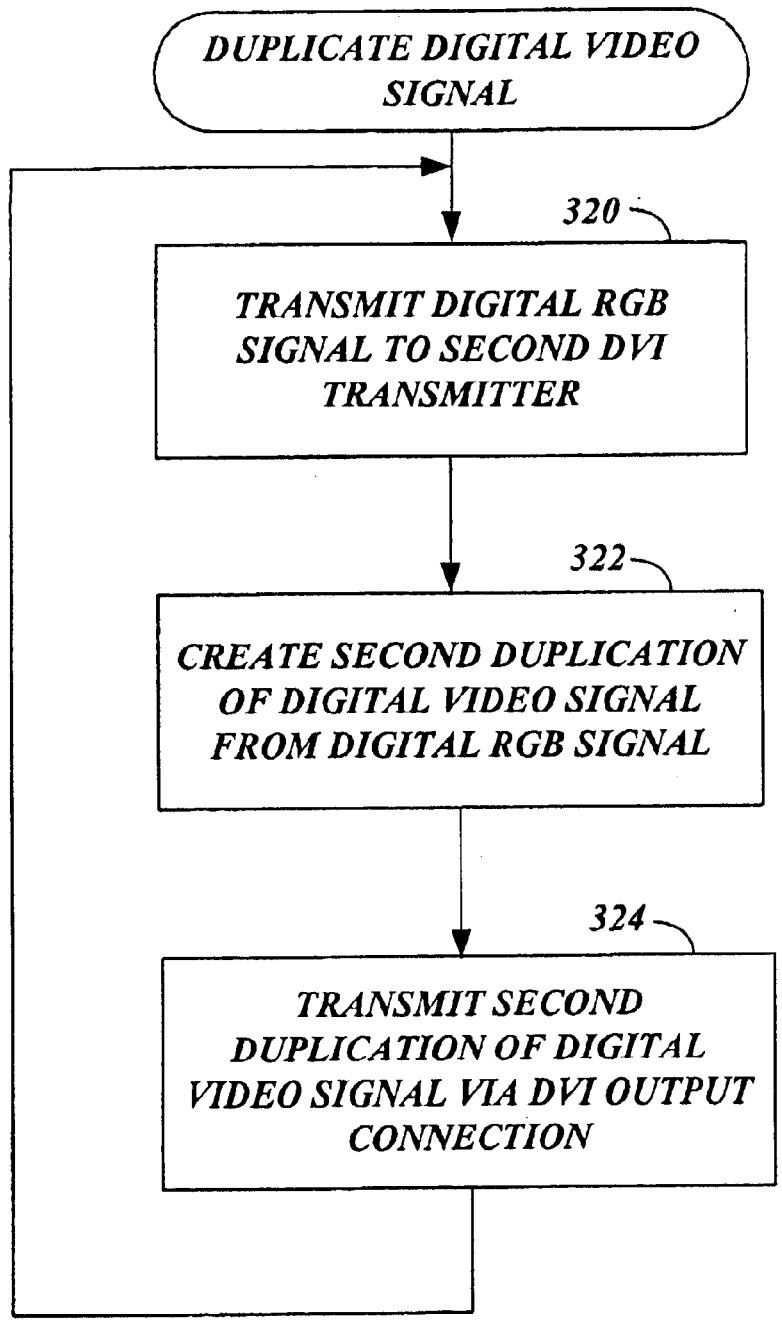
FIG. 3B depicts the logical operations for transmitting a digital video signal from the output of a local computer to a local display screen according to an embodiment of the present invention.

FIG. 3B shows logical operations to provide digital video signals from an output of local computer 102 to local display screen 116. The digital RGB signal created at signal creating operation 304 is transmitted to the DVI transmitter 242 at transmit operation 320. This transmission occurs in parallel with grab operation 308 described above or transmit operation 310 depending on whether the signal is to be scaled or not. A second duplication of the digital video signal from the digital RGB signal is created at duplication operation 322. The second duplication of the digital video signal is transmitted to a local display screen at transmit operation 324.

Figure 3C:
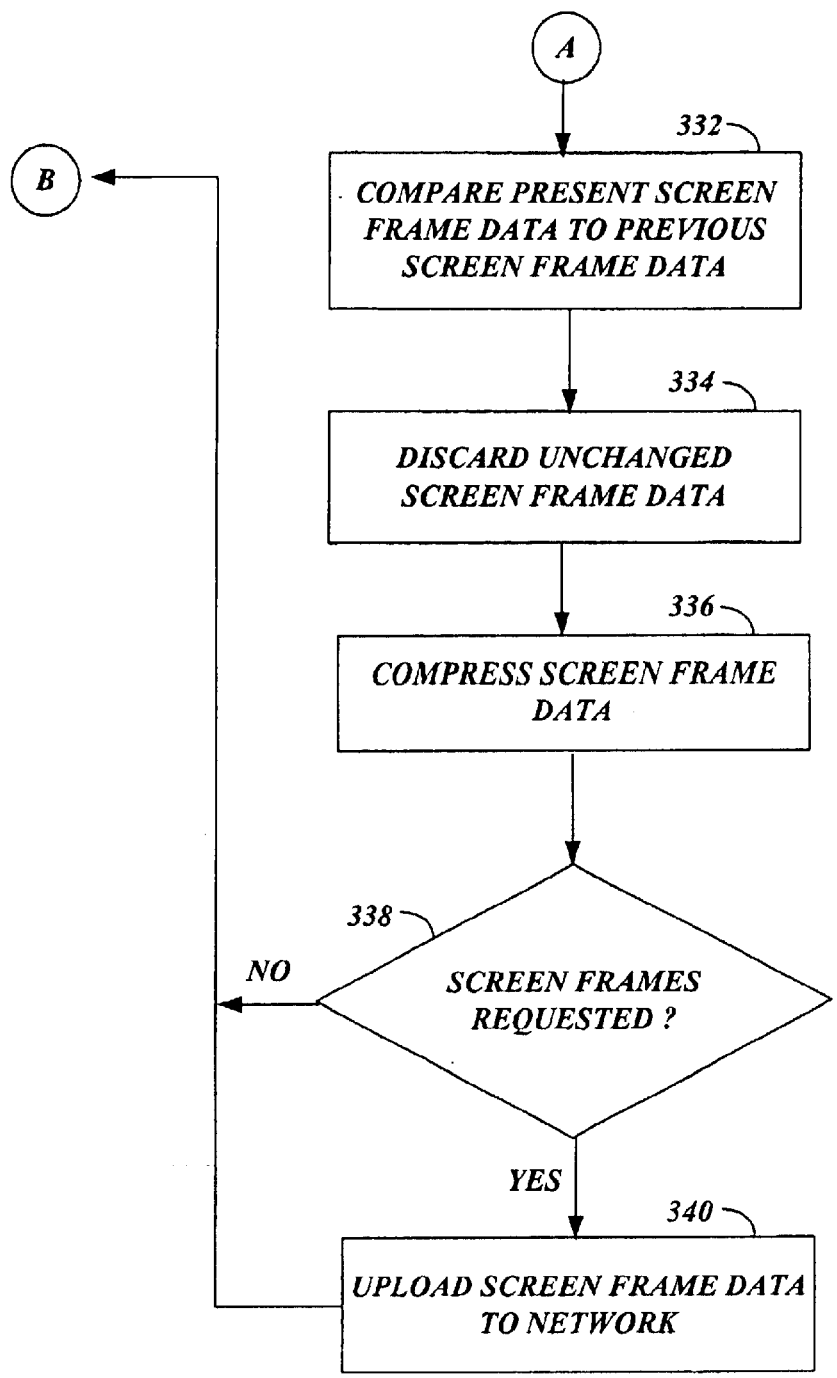
FIG. 3C depicts the logical operations of an embodiment of the present invention for obtaining screen frames from a local computer that may then be transmitted to a remote computer for display.

FIG. 3C shows logical operations that may be performed by the components of the interaction device 110 to provide screen frames of the local computer 102 to the remote computer 120. The operations begin at frame operation 330 where the frame grabber 206 grabs a screen frame for the digitized video signal. This digitized signal may be the digital RGB signal from operation 308 or the scaled digital RGB signal from operation 318. As mentioned above, the digitized video signal may be produced by an analog to digital converter, may be taken directly from a digital video output of the local computer 102, and may be scaled or unscaled.

Once a screen frame has been obtained, the difference between the current screen frame data and the previous screen frame data is found through the filtering and/or XOR function as discussed above at comparison operation 332. At discard operation 334, the unchanged screen frame data can be discarded since it has already been transferred over the network 118 for the previous screen frame. As discussed above, an alternative to detecting the changes from one screen frame to the next is to always transfer the entire screen frame data rather than only the changes, but additional network bandwidth will be utilized by the larger data transfers. Also, as discussed above, rather than always sending the result of the XOR function, a threshold filter may be applied first to determine whether the current screen frame data has a significant change (e.g., greater than 7 bits of variation for a pixel value) to decide to send no screen frame data when the change is less than the threshold or to send the result of the XOR between the first and second screen frame data sets when the change is greater than the threshold.

After the screen frame data that is to be transferred has been obtained, the screen frame data may be compressed at compression operation 336. The screen frame data may be compressed through any one of various compression schemes to further reduce the amount of data to be transferred. The compression scheme may be programmed into either the frame differential component 210 or the processing device 220. Alternatively, the screen frame data may be transferred without being compressed, but additional network bandwidth will be utilized due to larger data transfers.

Query operation 338 of the web server 224 detects whether screen frames have been requested by an attempt to access the IP address of the web server 224 for the network 118. Once screen frame data has been requested, the current screen frame data that has been obtained and compressed is uploaded from the web server 224 over the network 118 at upload operation 340. The data is directed to the IP address of the remote computer 120 that addressed the web server 224. Additionally at upload operation 340, the control information 230 including browser commands such as a JAVA™ applet or Active X control may be transferred from the web server 224.

Figure 4:
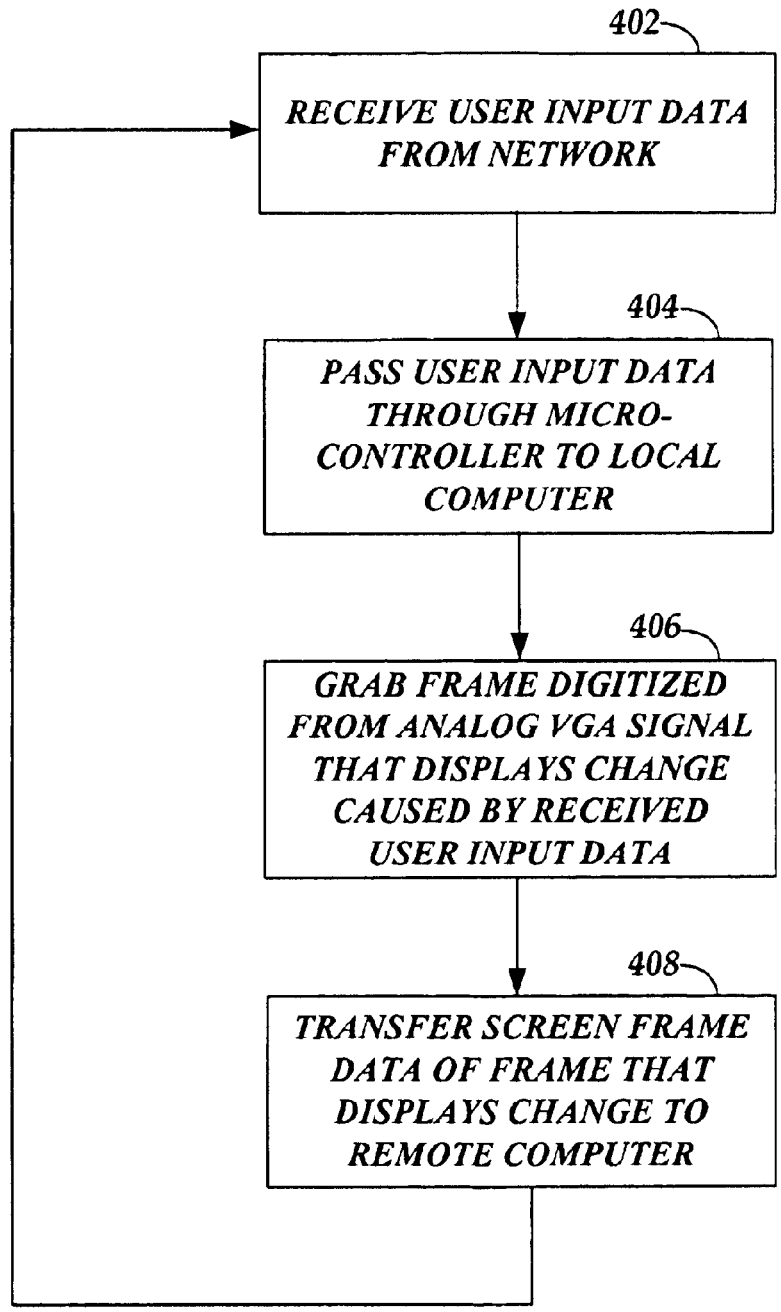
FIG. 4 shows the logical operations of the embodiment of FIG. 2A for allowing user activity occurring at the remote computer to be implemented at the local computer.

FIG. 4 shows the logical operations performed by the interaction device 110 to provide a user of the remote computer 102 the ability to interact with the local computer 102. The processing device 220 receives the user input data from the network 118 at input operation 402. The user input data is generally produced by the browser commands as a result of the user manipulating the mouse 130 or keyboard 132 in relation to the screen frame being displayed within the browser. As discussed above, the browser commands that detect the user input and produce the user input data may be a plug-in to the browser window or may be an applet that is distributed to the browser when screen frame data is initially requested.

Upon receiving the user input data from the network 118, the processing device 220 instructs the microcontroller 228 to provide mouse or keyboard data signals corresponding to the user input data to the local computer 102 at controller operation 404. Thus, the processing device 220 formulates an instruction to the microcontroller 228 to move the mouse pointer, perform a mouse click, or to enter keyboard entries as appropriate at the local computer 102.

During this time, the interaction device 110 continues to grab screen frames and transfer them to the remote computer 120. During and after implementing the mouse and keyboard activity received through the network 118, screen frames are obtained at frame operation 406 that display the change that has been implemented due to the user activity at the remote computer 120. For example, if the user activity is mouse pointer movement, then the succession of captured screen frames show the movement of the mouse pointer.

At transfer operation 408, the screen frame data that which shows the user activity is transferred from the interaction device 110 to the remote computer 120. The remote computer 120 then updates the screen frame being displayed within the browser window. As previously discussed, this loop may result in artifacts such as multiple mouse pointers on the screen frame but as propagation and processing delays decrease, the immediate and delayed changes to the screen frame converge in time so that the artifacts are no longer perceivable. Also, the mouse over window option may be turned off at the remote computer for the browser window displaying the screen frames.

The process of updating the screen frame, receiving additional user input, transferring the user input for implementation by the local computer 102, and again updating the screen frame continues until the remote computer 120 no longer accesses the interaction device 110. This continuous loop allows the user of the remote computer 120 to interact with and manage the local computer 102.

Figure 5:
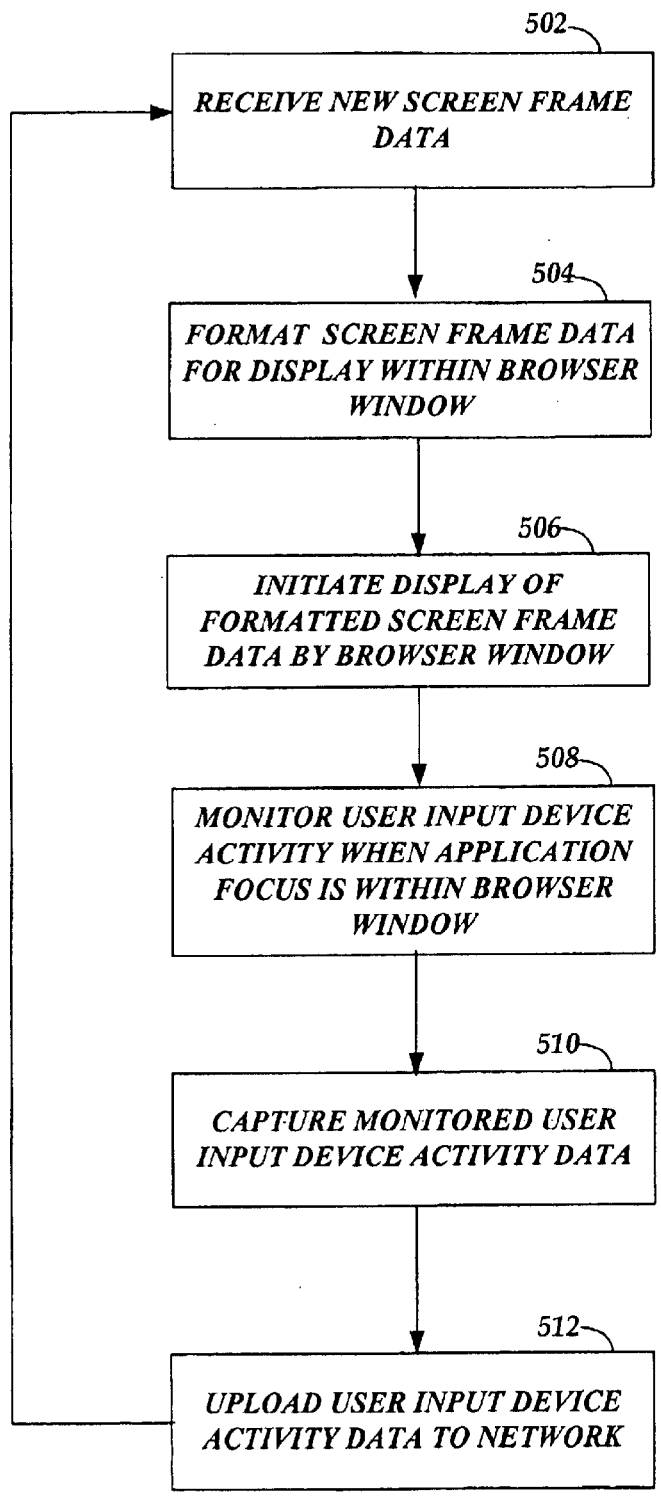
FIG. 5 illustrates the logical operations occurring at the remote computer for allowing screen frames of the local computer to be displayed at the remote computer.

Illustrative logical operations performed by the remote computer 120 to receive and display the screen frames of the local computer 102 are shown in FIG. 5. The remote computer 120 receives the most current screen frame data from the network 118 at receive operation 502. The remote computer 120 receives the screen frame data through the network interface 124 which provides the data to a processor that implements a dedicated application or browser window for displaying the screen frame.

The processor implementing the browser window formats the screen frame data for display within the browser window at format operation 504 by execution of the browser commands discussed above. Formatting the data involves either adapting the screen frame data for full screen display at the resolution provided by the remote computer 120 or for display within a GUI window on the display screen 134 with corresponding scroll bars for the window if necessary. The processor of the remote computer 120 then initiates display of the formatted screen frame data by the browser window at display operation 506.

The browser window implementing the browser commands then monitors for user activity within the screen frames being displayed by the browser window at monitor operation 508 whenever the browser window is the active focus of the GUI. When activity is detected, the browser commands cause user activity to be recorded at capture operation 510. Recording the user activity involves recording the mouse pointer movement and mouse clicks along with the relative coordinates of the mouse pointer within the screen frame. For example, if the mouse pointer is positioned at a particular location on the screen frame and is moving in a particular direction, the recorded user activity data includes both the location of the pointer relative to the coordinates defining the screen frame and the movement characteristics such as speed and direction. Additionally, recording the user activity involves recording the position of the cursor within the screen frame and any typing that occurs for the cursor position.

The browser commands then continually upload the user input data to the IP address of the web server 224 at upload operation 512. As discussed in relation to FIG. 4, the interaction device 110 receives the user input data and provides mouse and keyboard signals to the local computer 102 so that the user inputs received at the remote computer 120 can be implemented by the local computer 102. The updated screen frames of the local computer 102 are then captured and transferred to the remote computer 120 for display so that the user can see that the user input has been implemented.

Figure 6:
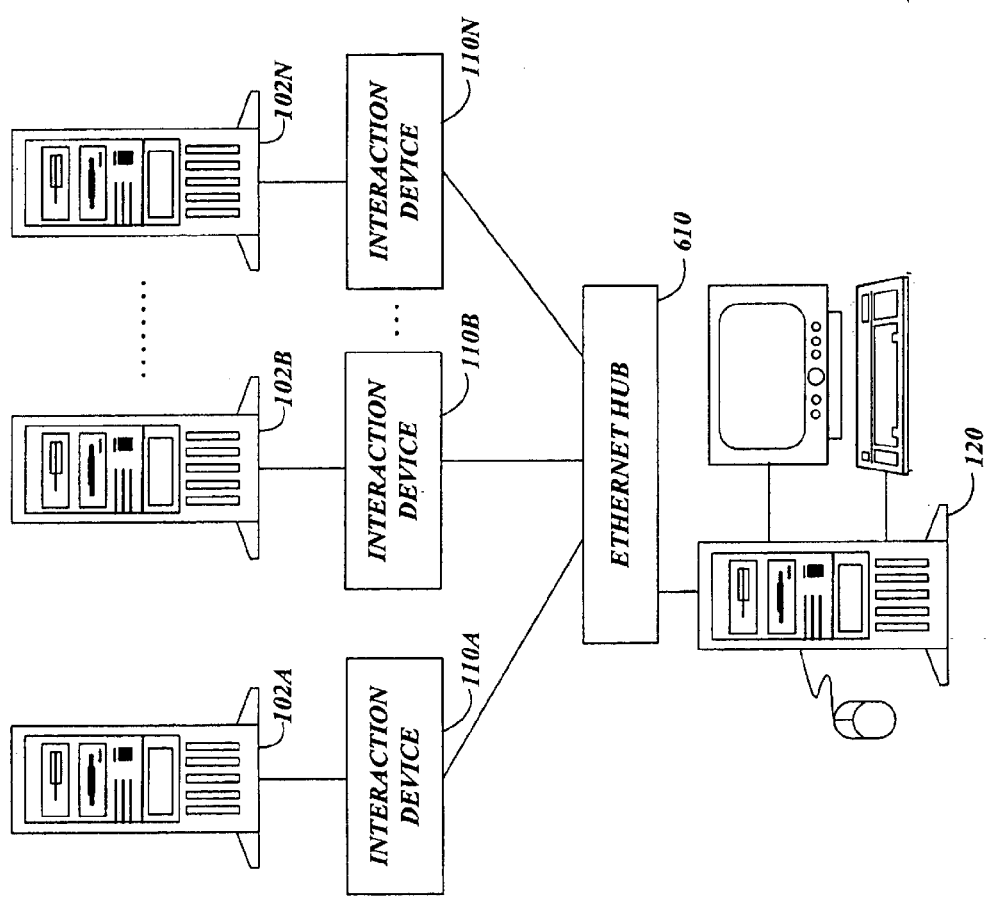
FIG. 6 illustrates an operating environment for embodiments of the present invention that allow a remote computer to display screen frames of a set of local computers and provide user interaction with the screen frames.

FIG. 6 depicts an operating environment for embodiments of the present invention that allow a remote computer to display screen frames of a set of local computers and provide user interaction with the screen frames. Each local computer 102A–N is interconnected to an interaction device 110 in the manner described above with respect to FIG. 1. The interaction devices 110A–N are then connected to a hub 610, which is again connected to a remote computer 120 typically over Ethernet. The remote computer 120 can access each interaction device 110A–N individually, or it can access all of the interaction devices simultaneously. Using this configuration, a user may capture screen frames from multiple local computers and interact with these computers in the same manner as described above for a single local computer 102.

Figure 7:
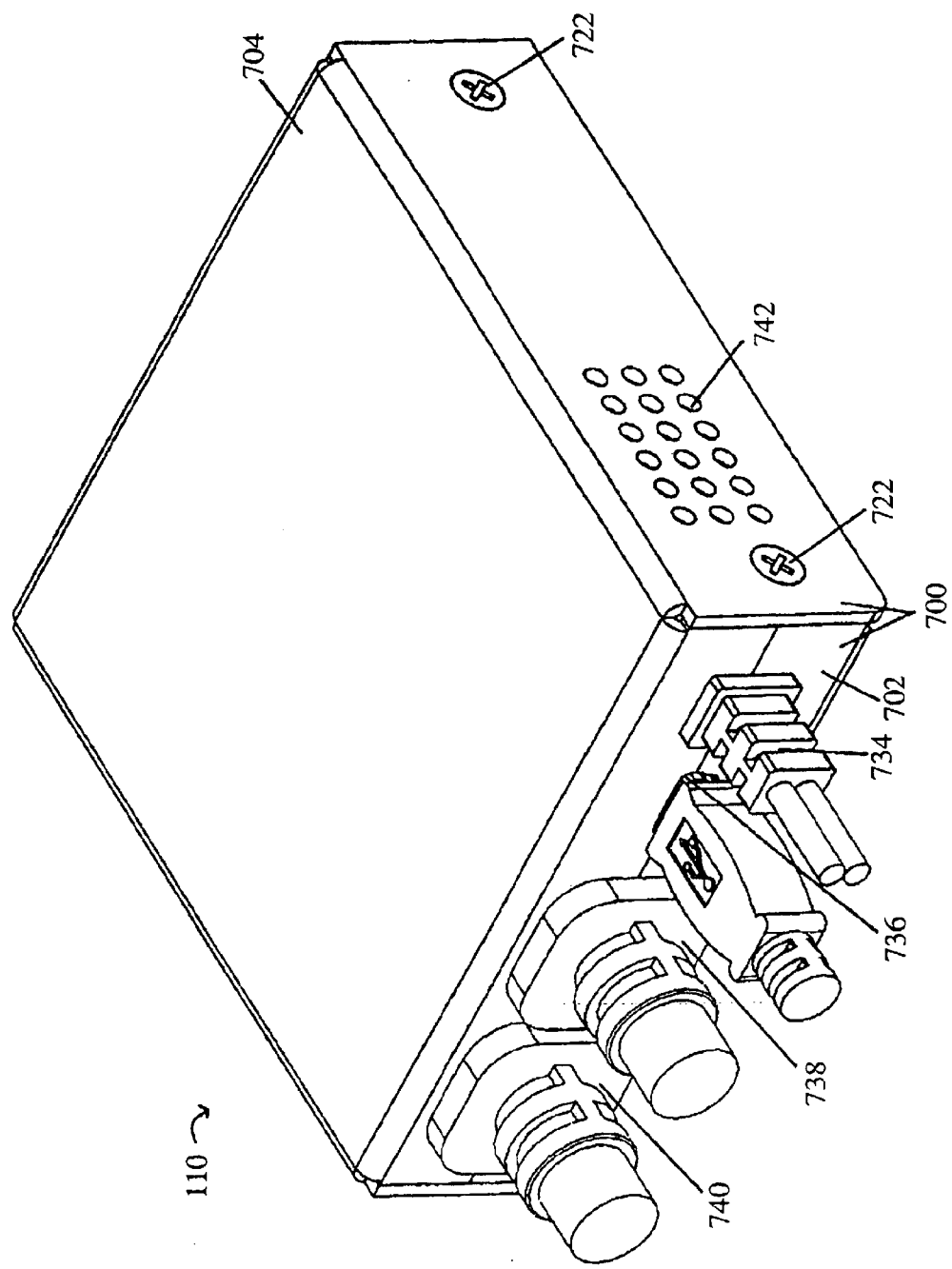
FIG. 7 shows a front perspective view of an interaction device according to one embodiment of the present invention.
Figure 8:
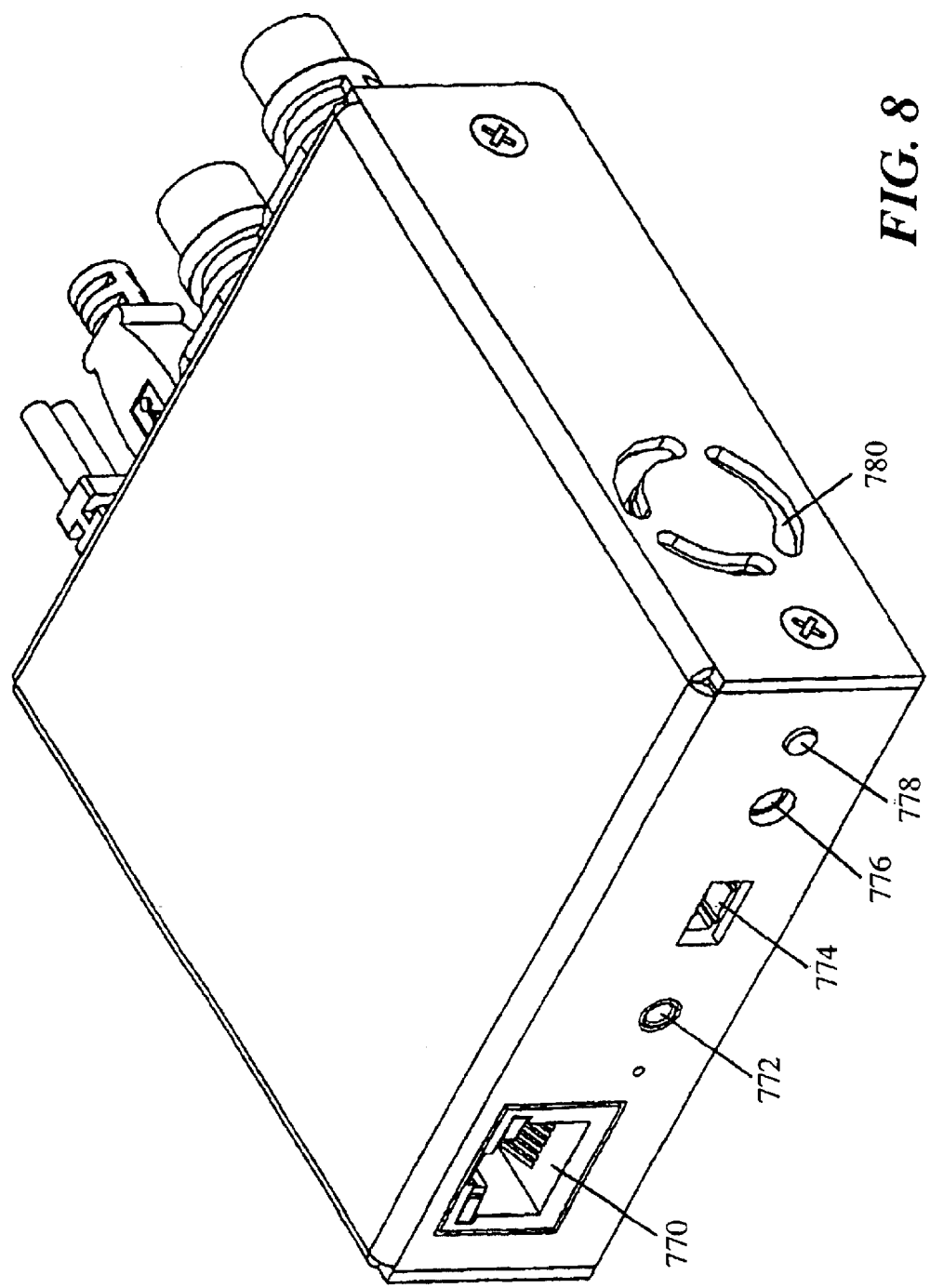
FIG. 8 shows a rear perspective view of an interaction device according to one embodiment of the present invention.

FIGS. 7 and 8 show perspective front and rear views respectively of an external implementation of the interaction device 110. Interaction device 110 has a housing 700 comprising a bottom cover 702 and a top cover 704. Housing 700 provides several ports for connection to local computer 102 and to a network 118 for communication with a remote computer 120. FIG. 7 shows strain relief grommet 734 for the mouse input port 794 and keyboard input port 796 (shown in FIG. 12) that are connected to the local mouse 112 and local keyboard 114, respectively. These input ports for the mouse and keyboard may be PS/2 style ports, standard keyboard ports, standard serial ports, or other connection types known for a keyboard and mouse.

Also seen in FIG. 7 are strain relief grommets 738 and 740 for the video input port 798 and video output port 800

(shown in FIG. 13A) that are connected to the local computer 102 and display monitor 116, respectively. These input and output ports 798 and 800 may be DVI male and female connectors, VGA male or female connectors, or any other connector types known for video input and output. The interaction device 110 also includes USB connector 736 to establish USB connectivity between the interaction device 110 and local computer 102 for USB node emulation as discussed above.

FIG. 8 shows a rear view of one embodiment of interaction device 110. Network connector 770 allows connection to network 118, providing a bi-directional communication path for sending and receiving data, as discussed above. Recovery switch 771 allows a user to recover from a firmware upgrade where the upgrade process failed or was interrupted. Normally, a firmware upgrade is done over the network 118 through the network connector 770. If the connection is lost during an upgrade, the firmware image may be corrupted. The recovery switch 771 may be held in at power-up, allowing the interaction device 110 to enter a protected boot block of code that is never overwritten during a firmware upgrade.

RS-232 port 772 provides an interface for connecting the interaction device 110 to a serial port of the local computer 102. A cable (not shown) may be provided with the interaction device 110 that has a connector for port 772 on one end and a standard DB-9 connector for a serial port on local computer 102. Port 772 may be used for debugging, diagnostics, and firmware upgrades. Additionally, a user may connect the interaction device 110 to a serial port of the local computer 102 using port 772 and associated cable, and use a terminal program to configure network settings, such as DCHP or static IP address, netmasks, and gateways. RS-232 port 772 may also be connected to a number of readily available power switches, which can be used to control power on and off to one or multiple servers.

Various power sources may be included for the device 110. On-board batteries and/or a wall adapter may be utilized to provide the DC voltage required by the circuitry described above. Furthermore, the device 110 may draw power from various connections made to the local computer 102, such as through the mouse or keyboard ports. Auxiliary port 774 provides a 3-pin connector for either receiving power for the interaction device 110 or for consuming power from the interaction device. An external device may be attached to the interaction device 110 through auxiliary port 774. If this device connected to port 774 requires power, the interaction device 110 can provide a current through port 774. In this situation, a DC power supply must be attached to the interaction device 110 through port 776. DC power supply port 776 is provided for use with a wall adapter. LED 778 provides an indication that interaction device 110 is receiving power.

One side of housing 700 provides aperture 780 behind which fan assembly 732 is mounted. The opposing side of housing 700 provides a plurality of ventilation holes 742 (shown in FIG. 9) to further aid in device cooling. It is to be understood that housing 700 may provide apertures for any number and variety of connectors, LEDs, and cooling devices. Additionally, it is to be understood that while housing 700 has been described here and shown in FIGS. 7–14 as substantially a six-sided device, housing 700 may be formed in any shape and with any dimensions.

The external interaction device 110 allows the device to be easily added to a local computer 102. Because all connections to the local computer 102 are external, the device 110 can be quickly and easily installed or removed. However, it should be appreciated that the interaction device 110 may be of various forms, including internal implementations where the device 110 is located inside the local computer 102 and one or more of the connections to the local computer 102 are made internally.

Figure 9:
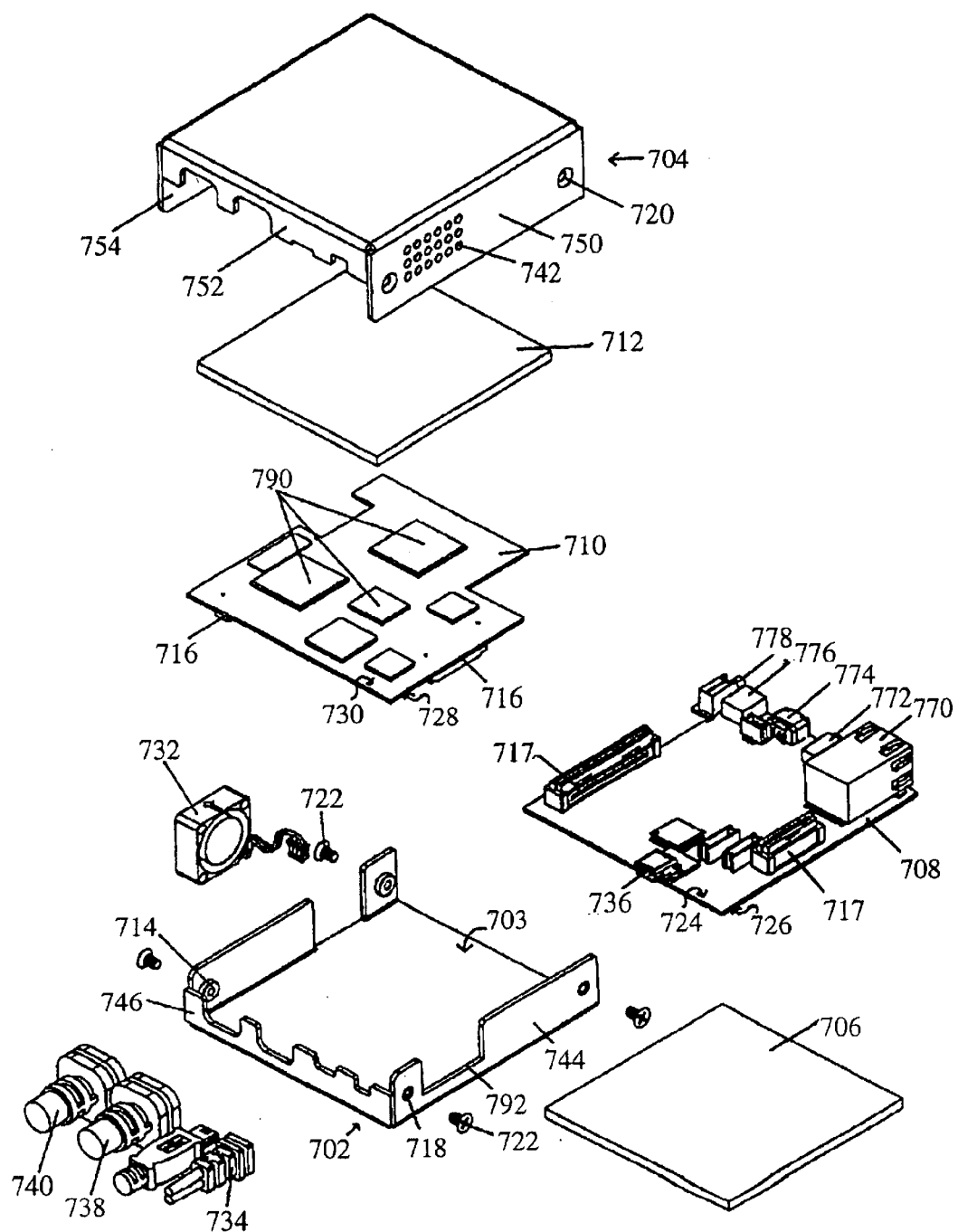
FIG. 9 shows an exploded top perspective view of an interaction device according to one embodiment of the present invention.

Referring to FIG. 9, housing 700 comprises bottom cover 702 and top cover 704. Housing 700 has an inner surface 703. Gap pads 706 and 712 and circuit boards 708 and 710 are enclosed within housing 700. Circuit board 708 has an inner surface 724 and an outer surface 726. Circuit board 710 also has an inner surface 728 and an outer surface 730. The outer surfaces 726 and 730 of circuit boards 708 and 712 face the inner surfaces 703 of bottom cover 702 and top cover 704 respectively. Gap pads 706 and 712 are disposed intermediate the outer surfaces 726 and 730 and the inner surface 703 of housing 700.

While FIGS. 7–14 depict housing 700 as comprising two sections, bottom cover 702 and top cover 704, it is to be understood that any number of sections may be joined together to form housing 700, including forming an integral housing out of a single piece of material. It is to be understood that the pads may alternatively be attached to bottom cover 702 and top cover 704, instead of being attached to the circuit boards, may be attached using any means now known or developed in the future, or may be disposed between the housing and the circuit boards without being attached to either. Gap pads 706 and 712 comprise any material that is electrically non-conductive and thermally conductive may be used to transfer heat away from circuit board mounted components. For instance, GAP PAD VO ULTRA SOFT pads manufactured by THE BERQUIST COMPANY of Chanhassen, Minn. may be utilized.

A plurality of standoffs 714 are affixed to bottom cover 702. Standoffs 714 project from the walls of bottom cover 702, slidably engaging the inner surface of circuit board 708. Additionally, standoffs 714 surround threaded apertures 718 that align with apertures 720 in top cover 704 and engage corresponding threaded fasteners 722 to secure top cover 704 to bottom cover 702. When installed into bottom cover 702, circuit board 708 is disposed between standoffs 714 and bottom cover 702 such that pad 706 contacts both the inner surface of bottom cover 702 and the components mounted to the outer surface of circuit board 708.

It is to be understood that while standoffs 714 appear in FIG. 9 to be circular disks, they may take any shape or form and may be manufactured from any material. Additionally, standoffs 714 may be threaded to receive fasteners 722 in place of or in addition to apertures 718. In another embodiment not shown, circuit board 708 is secured in housing 700 through the use of grooves in the walls of bottom cover 702, into which circuit board 708 slidably engages. In this embodiment, threaded apertures 718 exist to receive fasteners 722 for securing top cover 704 to bottom cover 702. In yet another embodiment not shown, circuit board 708 is secured into bottom cover 702 using spring arms rather than sliding under standoffs 714. Circuit board 708 is inserted vertically downward into bottom housing cover 702 such that circuit board 708 depresses the spring arms toward the side walls of bottom cover 702. As the edges of circuit board 708 clear the ends of the spring arms, the spring arms snap back to their original position, preventing circuit board 708 from being removed without depressing the spring arms.

Circuit board 710 is mounted to and electrically coupled to circuit board 708 through the use of board-to-board connectors 716 mounted on the inner surfaces of circuit boards 708 and 710. Top cover 704 fits over circuit board 710 and pad 712 such that apertures 720 align with apertures 718 in bottom cover 702 to receive fasteners 722. With top cover 704 mated to bottom cover 702, pads 706 and 712 abut the inner surfaces of the housing and the components mounted to circuit boards 708 and 710. Bottom cover 702 and top 704 are made of metal. It is to be understood that housing 700 may be manufactured from any thermally conductive material suitable for transferring heat away from pads 706 and 712.

Figure 10:
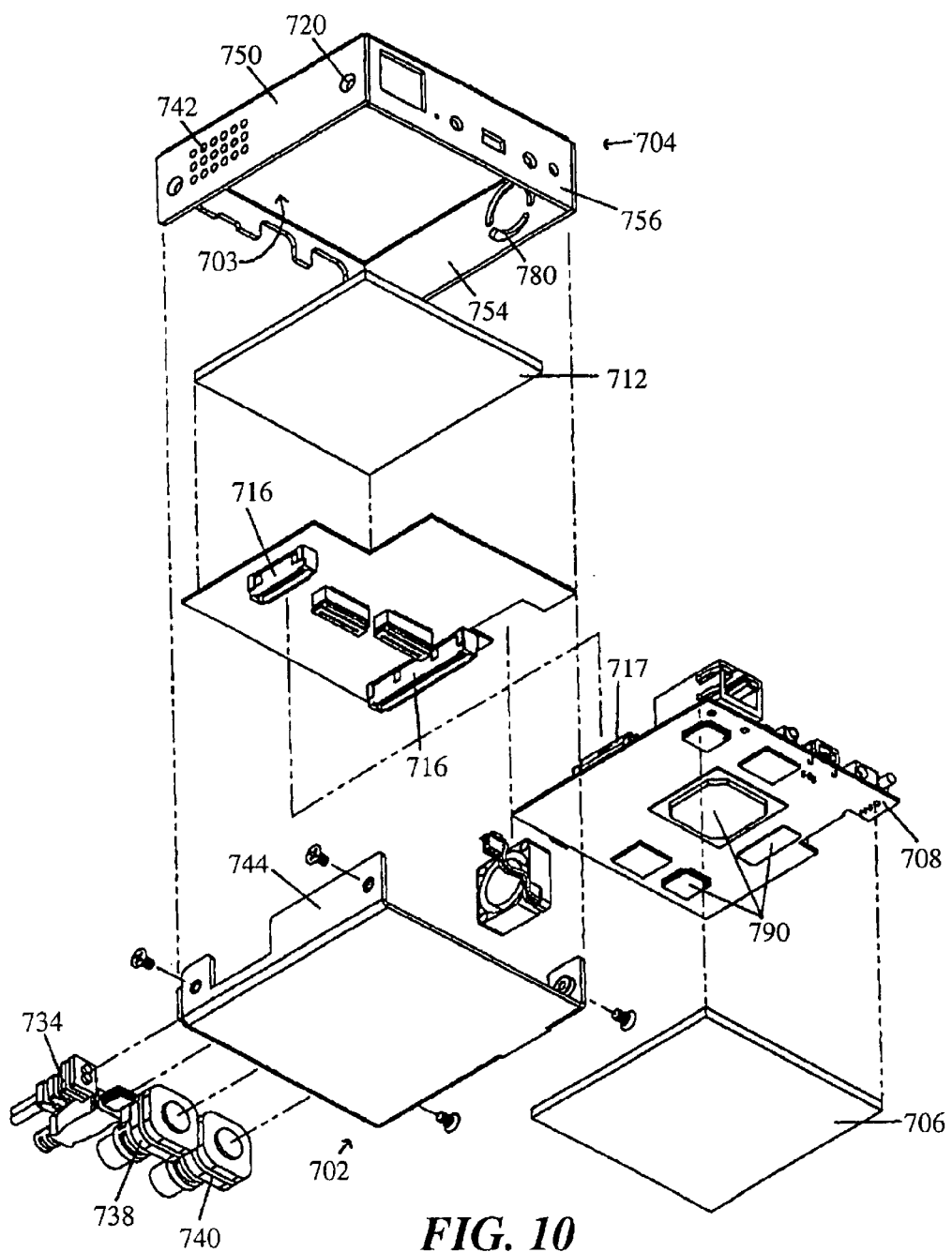
FIG. 10 shows an exploded bottom perspective view of an interaction device according to one embodiment of the present invention.

FIGS. 9 and 10 depict bottom cover 702 as comprising a four-sided horizontal surface that is substantially planar between the four sides, with vertical walls 744, 746, and 748 extending from the horizontal surface along three sides. Likewise, top cover 704 comprises a four-sided horizontal surface that is substantially planar between the four sides and is parallel to the plane of the horizontal surface of bottom cover 702. Top cover 704 has vertical walls, 750, 752, 754, and 756 extending from the sides of the horizontal surface. Wall 746 comprises cut-outs that correspond to the dimensions of grommets 734, 738, and 740 as well as USB connector 736. Wall 752 contains similar cut-outs. When top cover 704 is mated with bottom cover 702, wall 746 abuts wall 752 to form a front side of housing 700 wherein the cut-outs create apertures sized to secure the corresponding connectors. Walls 750 and 754 cover the exterior surface of walls 744 and 748 such that apertures 720 align with apertures 718 for insertion of fasteners 722.

To effectively dissipate heat away from heat-generating components mounted on circuit boards 708 and 710, the heat-generating components are mounted on the outer surfaces of circuit boards 708 and 710. Examples of heat-generating components include but are not limited to processors, SDRAMs, flash-ROM, USB controllers, switching power supply regulators and associated transistors, linear regulators, micro-controllers, Ethernet PHY, DVI receivers, DVI transmitters, FPGA, VGA video OP-AMP buffers, and analog-to-digital converters. In mounting heat-generating components on the outer surfaces of the circuit boards, the risk of significant heat buildup in the space between the circuit boards is minimized. Gap pads 706 and 712 are in contact with the heat-generating components.

As the components produce heat, the heat is transferred from the components, through the pads, through the housing, and into the atmosphere. Components that do not generate significant amounts of heat may be mounted on the inner surfaces of circuit boards 708 and 710 to efficiently utilize the space within housing 700. With fan assembly 732 mounted on one side of housing 700 and ventilation holes 742 positioned on the opposing side of housing 700, heated air is drawn from interaction device 110 or ambient air is pushed into housing 700 to aid in maintaining an acceptable operating temperature within interaction device 110. Using this configuration, the interaction device 110 is maintained at a temperature suitable for reliable operation while aiding portability by minimizing the device's overall footprint.

Circuit board 710 may be configured for either digital or analog image capturing. FIG. 13A shows male and female DVI connectors and their connections to their corresponding headers on circuit board 710. When circuit board 710 is configured for digital image capturing, DVI receivers, DVI transmitters, FPGA, SDRAMs, and switching power supply regulators and associated transistors may be mounted on the outer surface of the circuit board for contact with gap pad 712. Circuit board 710 may also be configured for analog image capturing. When configured for analog image capturing, male and female VGA connectors are attached to their corresponding headers on circuit board 710, and VGA video OP-AMP buffers, an analog-to-digital converter, FPGA, SDRAMs, and switching power supply regulators and associated transistors may be mounted on the outer surface of the circuit board for contact with gap pad 712. The remaining heat-generating components may be mounted on the outer surface of circuit board 708.

Using this configuration, interaction device 110 may be easily reconfigured from analog image capturing to digital, or from digital image capturing to analog. It is to be understood that the present invention is not limited to the use of two circuit boards. All of the components could be mounted on a single circuit board, or on more than two circuit boards depending on the particular application and desired housing dimensions. When utilizing more than two circuit boards, the heat-generating components are disposed on the outer surfaces of the outside circuit boards, while the remaining components are mounted on inside circuit boards to aid in heat removal out of interaction device 110 through the gap pads to the housing. The outside circuit boards are those that are disposed adjacent to the inner surface 703 of housing 700 such that no other circuit boards are disposed between the outer surfaces of the outside circuit boards and the inner surface 703 of housing 700. The use of two circuit boards as described here allows for a compact device that is easy to configure and which effectively dissipates heat.

Figure 11:
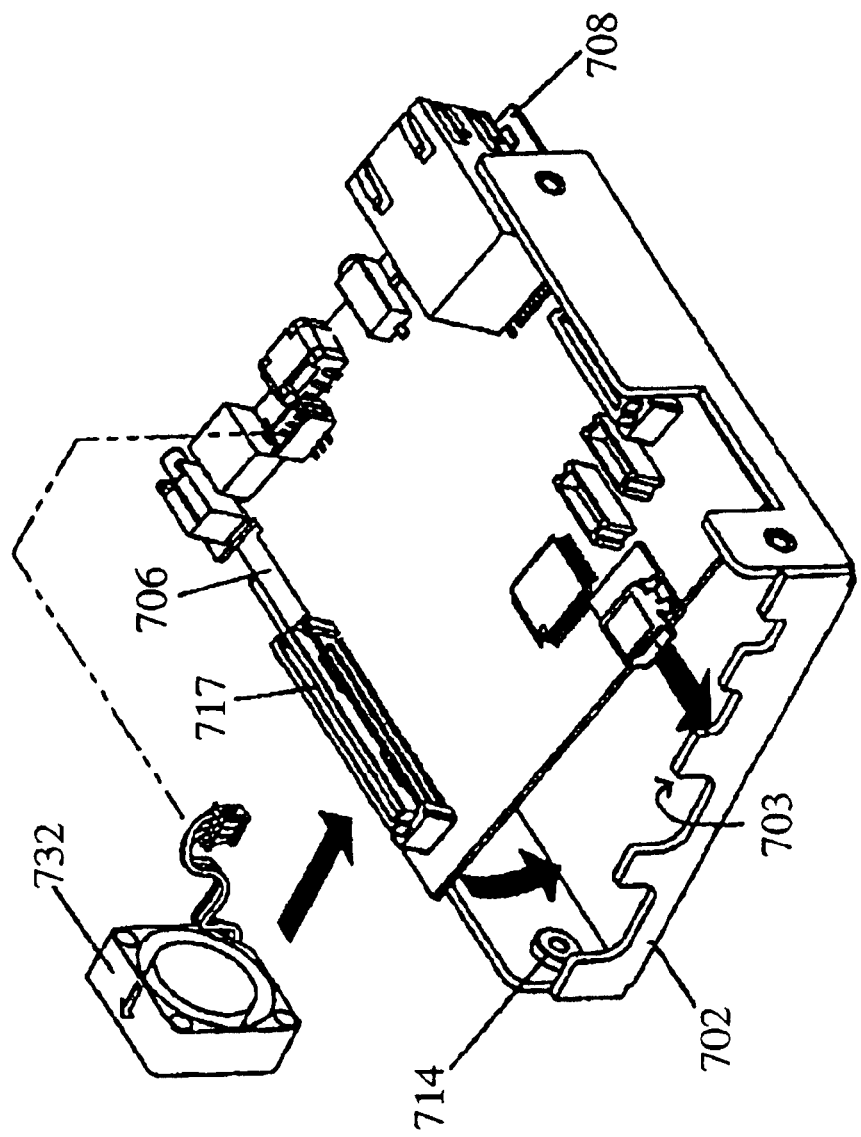
FIG. 11 illustrates the installation of a circuit board and fan assembly into a bottom cover of an interaction device according to one embodiment of the present invention.

The present invention is also directed to a method of assembly for an interaction device for obtaining screen displays of a local computer and providing them to a remote computer over a network. This method is illustrated in FIGS. 11–14. Heat generating components 790 are mounted to outer surfaces of circuit boards 708 and 710. Heat generating components may include but are not limited to processors, SDRAMs, flash-ROM, USB controllers, switching power supply regulators and associated transistors, linear regulators, micro-controllers, Ethernet PHY, DVI receivers, DVI transmitters, FPGA, VGA video OP-AMP buffers, and analog-to-digital converters. As seen in FIG. 11, a first gap pad 706 is attached to the outer surface of circuit board 708 such that it contacts heat generating components 790.

Circuit board 708 is slid into bottom cover 702 such that opposing edges of circuit board 708 slide under standoffs 714 located on the inner surfaces of the side walls to bottom cover 702. When circuit board 708 is in place, standoffs 714 contact the inner surface to hold circuit board 708 in place. Standoffs 714 are positioned to ensure that circuit board 708 is held snugly in place such that gap pad 706 contacts the inner surface 703 of bottom cover 702 and the heat generating components 790 on the outer surface of circuit board 708. Fan assembly 732 is connected to a fan header on circuit board 708 and positioned in a cut-out of circuit board 708 such that it contacts gap pad 706 and removes hot air from within interaction device 110 through an aperture or series of apertures in the side wall of bottom cover 702. It is to be understood that fan assembly 732 may be positioned such that it blows ambient air into interaction device 110 rather than blowing heated air out of interaction device 110.

Figure 12:
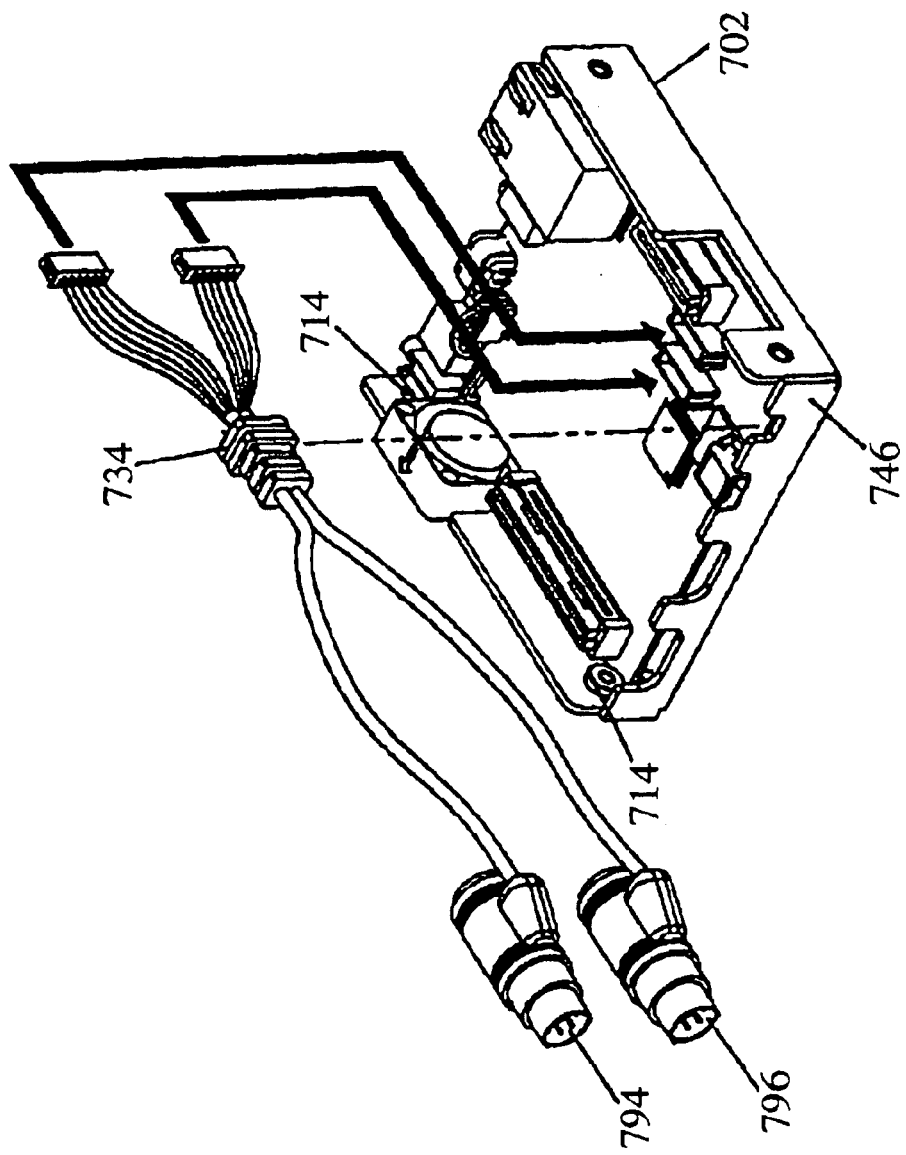
FIG. 12 illustrates the installation of mouse and keyboard connectors into the interaction device of FIG. 11.

As seen in FIG. 12, mouse and keyboard input ports 794 and 796 are placed in corresponding headers on circuit board 708. The mouse and keyboard grommet 734 is slid in place in a cut-out in wall 746 of bottom cover 702. If interaction device 110 is to be configured for capturing digital screen images, male and female DVI connectors are placed in corresponding headers on circuit board 710, as shown in FIG. 13A. The strain relief grommets 738 and 740 for male and female DVI connectors 798 and 800 are seated into cut-outs in wall 746 of bottom cover 702. If interaction device 110 is to be configured for capturing analog screen images, male and female VGA connectors are substituted for male and female DVI connectors (not shown). After connecting the video connectors to circuit board 710, board-to-board connectors 716 on circuit board 710 are mated to board-to-board connectors 717 on circuit board 708.

Figure 13B:
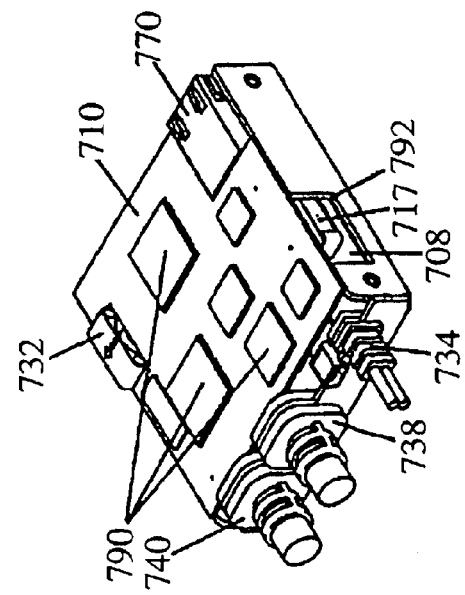
FIG. 13B illustrates the interaction device of FIG. 13A after installation of the DVI connectors and second circuit board.
Figure 13A:
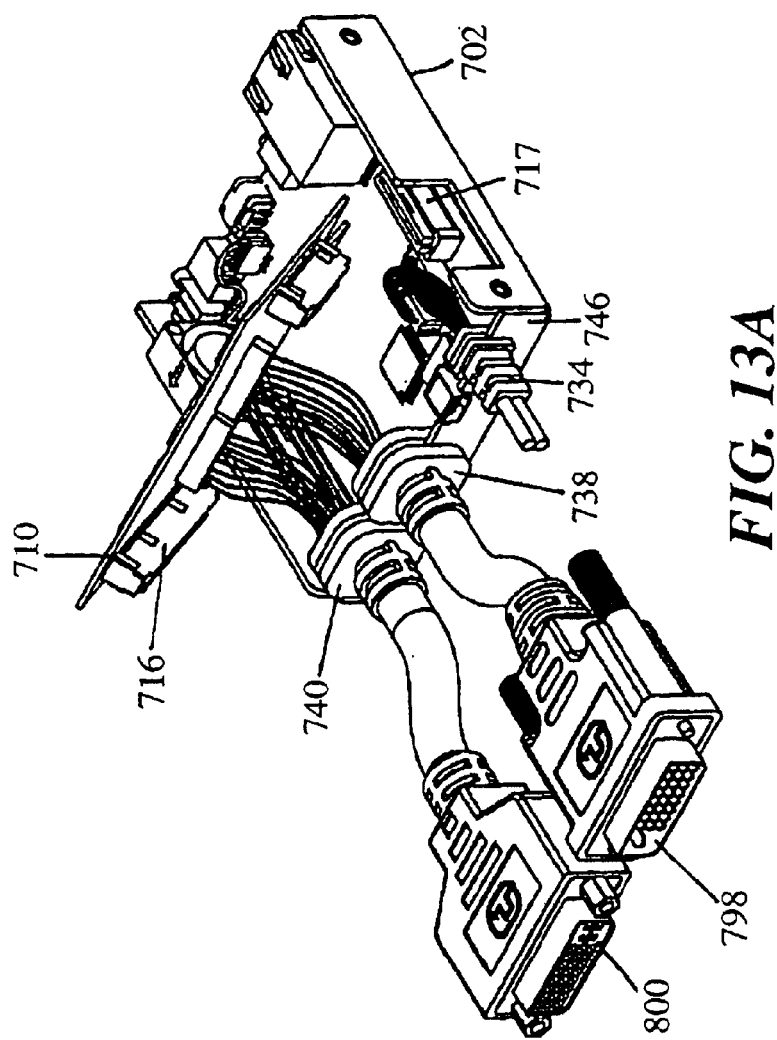
FIG. 13A illustrates the installation of digital video interface ("DVI") connectors and a second circuit board into the interaction device of FIG. 12.

FIG. 13B shows the interaction device with circuit boards 708 and 710 installed. Connector strain relief grommets 734, 738, and 740 can be seen as well as fan assembly 732. Heat producing components 790 are seen mounted on the outer surface of circuit board 710. Cutout 792 provides ventilation of the space between circuit boards 708 and 710. Ventilation holes 742, shown in FIG. 14 will align with cutout 792 when the top cover 704 is installed, allowing the fan to push or pull air through the gap between circuit boards 708 and 710.

Figure 14:
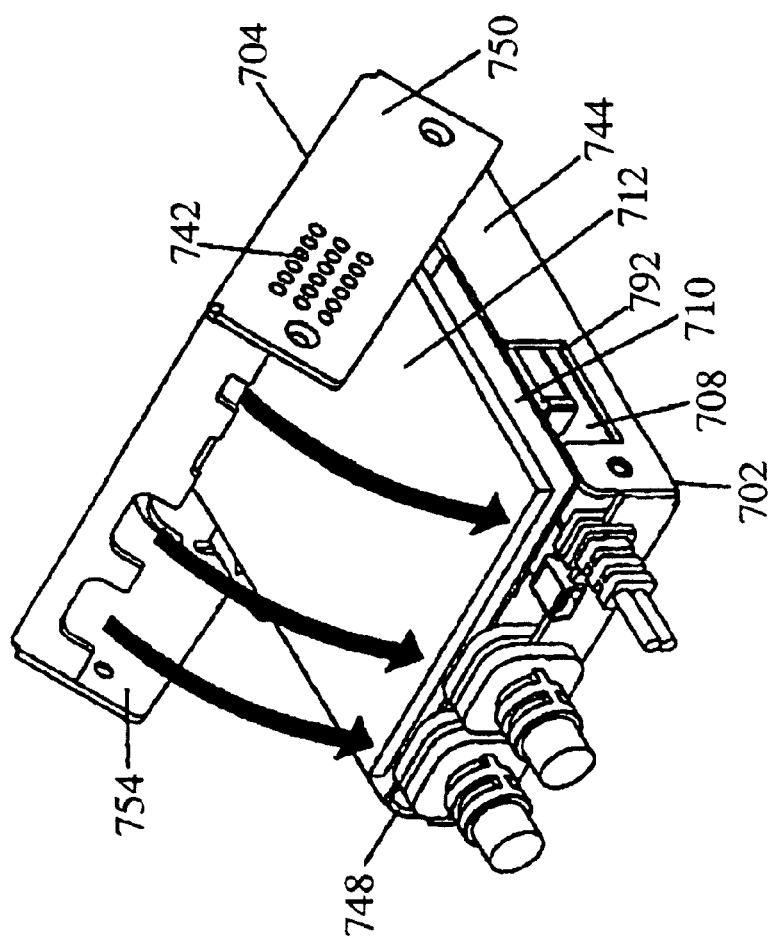
FIG. 14 illustrates the installation of a gap pad and top cover on the interaction device of FIG. 13B.

As seen in FIG. 14, a second gap pad 712 is attached to the outer surface of circuit board 710. Gap pad 712 is pressed lightly against the outer surface of circuit board 710 such that it contacts heat generating components 790. Finally, top cover 704 is placed over gap pad 712 such that gap pad 712 contacts the inner surface of top cover 704 as well as the heat generating components 790 mounted on the outer surface of circuit board 710. With top cover 704 in place, walls 750 and 754 enclose walls 744 and 748 of bottom cover 702 such that the inner surfaces of walls 750 and 754 abut the outer surfaces of walls 744 and 748 and apertures 720 in walls 750 and 754 align with apertures 718 in walls 744 and 748. Fasteners 722 are screwed into the aligned apertures 720 and 718 to secure the top cover 704 to bottom cover 702.

It is to be understood that top cover 704 may be secured to bottom cover 702 using any fastening means to include but not limited to clips, latches, hinge and latch mechanisms, nuts and bolts, and screws that engage threads on the top cover, the bottom cover, standoffs 714, or any combination therein.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. An interaction device for obtaining screen displays of a local computer and providing them to a remote computer over a network, comprising:
    a thermally conductive housing with a plurality of inner surfaces;
    a plurality of circuit boards disposed within the housing, wherein a first circuit board has an outer surface facing a first inner surface of the housing and a second circuit board has an outer surface facing a second inner surface of the housing;
    at least one heat-generating component disposed on the outer surface of each of the first and second circuit boards;
    at least one thermally conductive pad for each of the first and second circuit boards, the pads being disposed intermediate the outer surfaces of the first and second circuit boards and the first and second inner surfaces of the housing such that one side of each pad abuts the inner surface of the housing and an opposing side of each pad abuts the at least one heat-generating component disposed on the outer surface of the respective circuit board; and
    ventilation means for allowing ambient air to flow through the interior of the housing.

2. The interaction device of claim 1, further comprising:
    a network connection;
    a video input connection; and
    wherein the at least one heat-generating component comprises:
        a frame grabber circuit for capturing screen frame data that is received through the video input and that is representative of screen frames of the local computer;
        a network interface linked to the network connection; and
        a processing device for directing the screen frame data captured by the frame grabber circuit through the network interface.

3. The interaction device of claim 1,
    wherein the housing comprises a first substantially planar surface and a second substantially planar surface that is in a plane substantially parallel to a plane of the first substantially planar surface; and
    wherein the plurality of circuit boards comprises a first circuit board positioned within the housing such that the first circuit board is in a plane substantially parallel to the plane of the first substantially planar surface, and a second circuit board positioned within the housing relative to the first circuit board such that the second circuit board is in a plane that is substantially parallel to the plane of the first circuit board and that is substantially parallel to the plane of the second substantially planar surface.

4. The interaction device of claim 1, wherein the thermally conductive housing is made of metal.

5. The interaction device of claim 2, further comprising a digital video output connection, wherein the at least one heat-generating component comprises at least one digital video interface ("DVI") transmitter and at least one DVI receiver where the at least one DVI receiver receives a digital video signal through the video input, provides a digital red-green-blue ("RGB") video signal to the at least one DVI transmitter which transmits a digital video signal through the video output connection, and wherein the at least one DVI transmitter and at least one DVI receiver are mounted on the outer surface of a first circuit board such that a first thermally conductive pad is in contact with the at least one DVI transmitter and the at least one DVI receiver.

6. The interaction device of claim 2, further comprising an analog video output connection, wherein the at least one heat-generating component comprises at least one video buffer amplifier that receives an analog video signal through the input connection and provides a video signal through the output connection and an analog-to-digital converter that receives the analog video signal from the video buffer amplifiers and provides a digital video signal to the frame grabber circuit, and wherein the at least one video buffer amplifier and the analog-to-digital converter are mounted on the outer surface of a first circuit board such that a first thermally conductive pad is in contact with the video buffer amplifiers and the analog-to-digital converter.

7. The interaction device of claim 1, further comprising a plurality of standoffs on the interior surface of the housing, wherein the standoffs are adapted to receive fasteners and to slidably engage the first circuit board such that the circuit board is secured intermediate the standoffs and the first inner surface of the housing.

8. The interaction device of claim 1, further comprising a plurality of board-to-board connectors mounted on the plurality of circuit boards for electrically coupling the plurality of circuit boards.

9. The interaction device of claim 1, wherein the ventilation means comprises a fan disposed within a first wall of the housing and ventilation holes disposed within a second wall of the housing to permit air flow between the plurality of circuit.

10. A method of assembling an interaction device for obtaining screen displays of a local computer and providing them to a remote computer over a network, comprising:
   positioning a first thermally conductive pad such that a first surface of the first thermally conductive pad contacts an outer surface of a first circuit board;
   securing the first circuit board and first thermally conductive pad inside a bottom housing cover such that a second surface of the first thermally conductive pad contacts an inner surface of the bottom housing cover;
   positioning a second thermally conductive pad such that a first surface of the second thermally conductive pad contacts an outer surface of a second circuit board;
   electrically coupling the second circuit board to the first circuit board and securing the second circuit board inside the bottom housing cover;
   placing a top housing cover over the second circuit board wherein an inner surface of the top cover contacts a second surface of the second thermally conductive pad; and
   securing the top housing cover to the bottom housing cover.

11. The method of claim 10 wherein the bottom housing cover comprises opposing side walls with a plurality of standoffs on the interior surfaces of the side walls, and wherein securing the first circuit board into the bottom housing cover comprises inserting the circuit board into the bottom housing cover such that the plurality of standoffs slidably engage an inner surface of opposing edges of the circuit board.

12. The method of claim 10 wherein securing the top housing cover to the bottom housing cover comprises using threaded fasteners.

13. The method of claim 10 wherein electrically coupling the second circuit board to the first circuit board and securing the second circuit board inside the bottom housing cover comprises connecting board-to-board connectors on a second circuit board to board-to-board connectors on the first circuit board.

14. The method of claim 13 further comprising:
   prior to connecting board-to-board connectors on the second circuit board to board-to-board connectors on the first circuit board, connecting mouse and keyboard connector wires to headers on the first circuit board and connecting video input and video output connector wires to headers on the second circuit board; and
   seating strain relief grommets corresponding to a mouse and keyboard connector, video input connector, and video output connector into a front wall of the bottom housing cover.

15. The method of claim 10 wherein the bottom housing cover comprises a cut-out in a side wall sized to receive a fan assembly, and wherein the method further comprises connecting a fan assembly connector to a header on the first circuit board and mounting the fan assembly in the cut-out of the side wall of the bottom housing cover.

16. An interaction device for obtaining screen displays of a local computer and providing them to a remote computer over a network, comprising:

a network connection;

a video input connection;

a metal housing having a first substantially planar surface and having a second substantially planar surface that is in a plane substantially parallel to a plane of the first substantially planar surface;

a first circuit board disposed within the housing and containing a frame grabber circuit for capturing screen frame data that is received through the video input and that is representative of screen frames of the local computer, wherein the first circuit board is positioned within the housing such that the first circuit board is in a plane substantially parallel to the plane of the first substantially planar surface, and wherein the frame grabber circuit is disposed on a side of the first circuit board facing the first substantially planar surface;

a second circuit board disposed within the housing and containing a network interface linked to the network connection and containing a processing device for directing the screen frame data captured by the frame grabber circuit of the first circuit board through the network interface, wherein the second circuit board is positioned within the housing relative to the first circuit board such that the second circuit board is in a plane that is substantially parallel to the plane of the first circuit board and that is substantially parallel to the plane of the second substantially planar surface, and wherein the processing device and network interface are disposed on a side of the second circuit board facing the second substantially planar surface;

a first thermally conductive pad that is disposed between the first circuit board and the first substantially planar surface and that is in contact with the frame grabber circuit of the first circuit board and the first substantially planar surface; and a second thermally conductive pad that is disposed between the second circuit board and the second substantially planar surface and that is in contact with the network interface and processing device of the second circuit board and the second substantially planar surface.

17. The interaction device of claim 16, further comprising a digital video output connection, wherein the first circuit board further contains at least one DVI transmitter and at least one DVI receiver where the at least one DVI receiver receives a digital video signal through the video input, provides a digital RGB video signal to the at least one DVI transmitter which transmits a digital video signal through the video output connection, and wherein the first thermally conductive pad is in contact with the at least one DVI transmitter and the at least one DVI receiver.

18. The interaction device of claim 16, further comprising an analog video output connection, wherein the first circuit board further contains video buffer amplifiers that receive an analog video signal through the input connection and provides a video signal through the output connection, wherein the first circuit board further contains an analog-to-digital converter that receives the analog video signal from the video buffer amplifiers and provides a digital video signal to the frame grabber circuit, and wherein the first thermally conductive pad is in contact with the video buffer amplifiers and the analog-to-digital converter.

* * * * *

UNITED STATES PATENT AND TRADEMARK OFFICE
CERTIFICATE OF CORRECTION

PATENT NO. : 6,894,906 B2
DATED : June 21, 2005
INVENTOR(S) : Clas G. Sivertsen

It is certified that error appears in the above-identified patent and that said Letters Patent is hereby corrected as shown below:

Title page,
Item [56], References Cited, U.S. PATENT DOCUMENTS, "Pus" should read -- Pua --.
Item [57], ABSTRACT,
Line 8, "boards" should read -- board --.

Column 7,
Line 22, delete "look".

Column 19,
Line 3, should read:
9. The interaction device of claim 1, wherein the ventilation means comprises a fan disposed within a first wall of the housing and ventilation holes disposed within a second wall of the housing to permit air flow between the plurality of circuit boards.

Signed and Sealed this

Sixteenth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,894,906 B2  
DATED : May 17, 2005  
INVENTOR(S) : Clas G. Sivertsen It is certified that error appears in the above-identified patent and that said Letters Patent is hereby corrected as shown below:

Title page,  
Item [56], References Cited, U.S. PATENT DOCUMENTS, "Pus" should read -- Pua --.  
Item [57], ABSTRACT,  
Line 8, "boards" should read -- board --.

Column 7,  
Line 22, delete "look".

Column 19,  
Line 3, should read:  
9. The interaction device of claim 1, wherein the venti-  
lation means comprises a fan disposed within a first wall of  
the housing and ventilation holes disposed within a second  
wall of the housing to permit air flow between the plurality  
of circuit boards.

This certificate supersedes Certificate of Correction issued August 16, 2005.

Signed and Sealed this

Eighteenth Day of October, 2005

JON W. DUDAS  
*Director of the United States Patent and Trademark Office*